US012726313B2

(12) United States Patent
Wu et al.

(10) Patent No.: US 12,726,313 B2
(45) Date of Patent: Sep. 1, 2026

(54) METHOD AND APPARATUS FOR SIDELINK COMMUNICATION

(71) Applicant: SAMSUNG ELECTRONICS CO., LTD., Suwon-si (KR)

(72) Inventors: Min Wu, Beijing (CN); Miao Zhou, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 18/627,383

(22) Filed: Apr. 4, 2024

(65) Prior Publication Data

US 2024/0340142 A1 Oct. 10, 2024

(30) Foreign Application Priority Data

Apr. 4, 2023 (CN) ........................ 202310358040.2

(51) Int. Cl.
*H04L 5/00* (2006.01)
*H04W 72/1263* (2023.01)
*H04W 72/25* (2023.01)

(52) U.S. Cl.
CPC ....... *H04L 5/0051* (2013.01); *H04W 72/1263* (2013.01); *H04W 72/25* (2023.01)

(58) Field of Classification Search
CPC ... H04L 5/0048; H04L 5/0051; H04L 5/0057; H04L 5/0094; H04W 72/1263; H04W 72/25
USPC .......................................................... 370/329
See application file for complete search history.

(56) References Cited

U.S. PATENT DOCUMENTS

| | | | | |
|---|---|---|---|---|
| 12,185,349 | B2 * | 12/2024 | Ryu | H04W 72/1263 |
| 2021/0067997 | A1 * | 3/2021 | Wang | H04W 88/04 |
| 2021/0289580 | A1 * | 9/2021 | Damnjanovic | H04W 24/02 |
| 2021/0385714 | A1 * | 12/2021 | Paladugu | H04W 36/0009 |
| 2022/0201528 | A1 | 6/2022 | Shin et al. | |
| 2022/0295442 | A1 * | 9/2022 | Goyal | H04W 64/00 |
| 2023/0069141 | A1 * | 3/2023 | Yoshioka | H04L 5/0037 |

(Continued)

FOREIGN PATENT DOCUMENTS

WO 2022018688 A1 1/2022

OTHER PUBLICATIONS

International Search Report and Written Opinion of the International Searching Authority dated Jul. 8, 2024, in connection with International Application No. PCT/KR2024/004436, 10 pages.

(Continued)

*Primary Examiner* — Robert J Lopata

(57) ABSTRACT

The disclosure relates to a 5G or 6G communication system for supporting a higher data transmission rate. Embodiments of the present disclosure provide a sidelink communication method and a user equipment (UE). The method comprises: receiving, by a second UE, an SL-CSI-RS scheduled by an SCI transmitted by a first UE; performing measurement based on the SL-CSI-RS; and, upon receiving a signaling for triggering measurement reporting transmitted by the first UE, reporting a measurement result based on the SL-CSI-RS to the first UE, wherein the SL-CSI-RS transmission is standalone. Thus, the measurement and reporting of sidelink communication are realized, thereby facilitating beam management of sidelink communication in an FR2 frequency band.

20 Claims, 22 Drawing Sheets

(56) References Cited

U.S. PATENT DOCUMENTS

2023/0247513 A1* 8/2023 Paladugu ............ H04W 36/033
370/315
2023/0276504 A1* 8/2023 Kim .................. H04W 74/0833
370/329
2024/0015743 A1* 1/2024 Wang ................ H04W 72/1263
2025/0317947 A1* 10/2025 Lin ....................... H04L 5/0078
2025/0343586 A1* 11/2025 Zhao .................. H04B 7/06954

OTHER PUBLICATIONS

OPPO, "Sidelink beam management on FR2 licensed spectrum," 3GPP TSG RAN WG1 #112, R1-2300300, Athens, Greece, Feb. 27-Mar. 3, 2023, 8 pages.
Interdigital, Inc., "On enhanced Sl FR2 operation," 3GPP TSG RAN WG1 #112, R1-2301176, Athens, Greece, Feb. 27-Mar. 3, 2023, 5 pages.
Xiaomi, "Discussion on SL beam management in FR2 licensed spectrum," 3GPP TSG RAN WG1 #112 R1-2300579, Athens, Greece, Feb. 27-Mar. 3, 2023, 3 pages.
ZTE, et al., "Discussion on enhanced sidelink operation on FR2 licensed spectrum," 3GPP TSG RAN WG1 #112, R1-2300357, Athens, Greece, Feb. 27-Mar. 3, 2023, 5 pages.
Supplementary European Search Report dated Jun. 16, 2026, in connection with European Patent Application No. 24785270.0, 10 pages.

* cited by examiner

FIG. 11

| SL-CSI-RS#0 | SL-CSI-RS#1 | SL-CSI-RS#2 | SL-CSI-RS#3 | SL-CSI-RS#4 | SL-CSI-RS#5 | SL-CSI-RS#6 | SL-CSI-RS#7 |
|---|---|---|---|---|---|---|---|

FIG. 12

| SL-CSI-RS#0 | SL-CSI-RS#0 | SL-CSI-RS#1 | SL-CSI-RS#1 | SL-CSI-RS#2 | SL-CSI-RS#2 | SL-CSI-RS#3 | SL-CSI-RS#3 |
|---|---|---|---|---|---|---|---|

FIG. 13

| SL-CSI-RS#0 | SL-CSI-RS#0 | SL-CSI-RS#0 | SL-CSI-RS#0 | SL-CSI-RS#0 | SL-CSI-RS#0 | SL-CSI-RS#0 | SL-CSI-RS#0 |
| --- | --- | --- | --- | --- | --- | --- | --- |

METHOD AND APPARATUS FOR SIDELINK COMMUNICATION

CROSS-REFERENCE TO RELATED APPLICATION

This application is based on and claims priority under 35 U.S.C. § 119 to Chinese Patent Application No. 202310358040.2 filed on Apr. 4, 2023, in the China Intellectual Property Office, the disclosure of which is incorporated by reference herein in its entirety.

BACKGROUND

1. Field

The present disclosure relates to the technical field of wireless communication, and in particular, to a sidelink communication method and a user equipment (UE).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources

SUMMARY

The objective of embodiments of the present disclosure is to solve how to perform measurement and reporting related to sidelink communication.

In accordance with one aspect of embodiments of the present disclosure, there is provided a method executed by a second user equipment (UE) in a communication system, comprising:

receiving a sidelink channel state information reference signal (SL-CSI-RS) scheduled by sidelink control information (SCI) transmitted by a first UE;

performing measurement based on the SL-CSI-RS; and upon receiving a signaling for triggering measurement reporting transmitted by the first UE, reporting a measurement result based on the SL-CSI-RS to the first UE, wherein the SL-CSI-RS transmission is standalone.

Optionally, the SL-CSI-RS and 1st-stage sidelink control information (1st-stage SCI) are time-multiplexed, and/or the SL-CSI-RS and 2nd-stage sidelink control information (2nd-stage SCI) are time-multiplexed.

Optionally, the 2nd-stage SCI completely occupies first N time units of time domain resources of the SL-CSI-RS, where Nis an integer greater than or equal to 1.

Optionally, the number of time units completely occupied by the 2nd-stage SCI is determined in at least one of the following ways:

the number of time units occupied by the 2nd-stage SCI is indicated by the 1st-stage SCI; and the number of time units occupied by the 2nd-stage SCI is determined based on the number of sub-channels occupied by the SL-CSI-RS.

Optionally, determining the number of time units occupied by the 2nd-stage SCI based on the number of sub-channels occupied by the SL-CSI-RS includes at least one of the following ways:

the number of time units occupied by the 2nd-stage SCI is 2 if the number of sub-channels occupied by the SL-CSI-RS is less than or equal to a sixth threshold, or the number of time units occupied by the 2nd-stage SCI is 1 if the number of sub-channels occupied by the SL-CSI-RS is greater than the sixth threshold; and the number of time units occupied by the 2nd-stage SCI is 3 if the number of sub-channels occupied by the SL-CSI-RS is less than or equal to a seventh threshold, the number of time units occupied by the 2nd-stage SCI is 2 if the number of sub-channels occupied by the SL-CSI-RS is greater than the seventh threshold and less than or equal to an eighth threshold, or the number of time units occupied by the 2nd-stage SCI is 1 if the number of sub-channels occupied by the SL-CSI-RS is greater than the eighth threshold.

Optionally, the SL-CSI-RS includes at least one SL-CSI-RS resource, wherein one SL-CSI-RS resource is mapped to at least two consecutive time units.

Optionally, one SL-CSI-RS resource is mapped to at least two consecutive time units in at least one of the following ways:

the one SL-CSI-RS resource is mapped to the at least two consecutive time units by repeating on time units;

the one SL-CSI-RS resource is mapped to the at least two consecutive time units by cyclic shifting; and the one SL-CSI-RS resource is mapped to the at least two consecutive time units by generating a longer SL-CSI-RS signal sequence.

Optionally, the number of time units occupied by one SL-CSI-RS resource is determined in at least one of the following ways:

the number of time units occupied by one SL-CSI-RS resource is indicated by the SCI;

the number of time units occupied by one SL-CSI-RS resource is determined based on the number of sub-channels occupied by the SL-CSI-RS; and the number of time units occupied by one SL-CSI-RS resource is determined by the total number of time units occupied by the SL-CSI-RS and the number of SL-CSI-RS resources included in the SL-CSI-RS.

Optionally, determining the number of time units occupied by one SL-CSI-RS resource based on the number of sub-channels occupied by the SL-CSI-RS includes at least one of the following ways:

the number of time units occupied by one SL-CSI-RS resource is 2 if the number of sub-channels occupied by the SL-CSI-RS is less than or equal to a ninth threshold, or the number of time units occupied by one SL-CSI-RS resource is 1 if the number of sub-channels occupied by the SL-CSI-RS is greater than the ninth threshold; and the number of time units occupied by one SL-CSI-RS resource is 3 if the number of sub-channels occupied by the SL-CSI-RS is less than or equal to a tenth threshold, the number of time units occupied by one SL-CSI-RS resource is 2 if the number of sub-channels occupied by the SL-CSI-RS is greater than the tenth threshold and less than or equal to an eleventh threshold, or the number of time units occupied by one SL-CSI-RS resource is 1 if the number of sub-channels occupied by the SL-CSI-RS is greater than the eleventh threshold.

Optionally, the SL-CSI-RS is mapped to all of allocated resource elements (REs) in at least one time unit; or, the SL-CSI-RS is mapped to part of the allocated REs in the at least one time unit, and the transmitting power on other allocated REs in the at least one time unit is boosted to the part of the allocated REs.

Optionally, the SL-CSI-RS is mapped to all of the allocated REs in the at least one time unit in at least one of the following ways:

the SL-CSI-RS is mapped to all of the allocated REs in the at least one time unit by repeating on REs; and the SL-CSI-RS is mapped to all of the allocated REs in the at least one time unit by generating a longer SL-CSI-RS signal sequence.

Optionally, the SL-CSI-RS includes at least one SL-CSI-RS resource, and an index of the at least one SL-CSI-RS resource is determined in at least one of the following ways:

the index of the first SL-CSI-RS source in the at least one SL-CSI-RS resource is indicated by an SCI, and indexes of the remaining SL-CSI-RS resources are progressively increased sequentially;

an index of an SL-CSI-RS resource set where the at least one SL-CSI-RS resource is located is indicated by the SCI, and the index of each SL-CSI-RS resource included in the SL-CSI-RS resource set is configured by a PC5 radio resource control (RRC) signaling; and the index of each SL-CSI-RS resource in the at least one SL-CSI-RS resource is separately indicated by the SCI.

Optionally, the SL-CSI-RS includes at least one SL-CSI-RS resource, and the method further includes:

indicating, by the SCI, whether the at least one SL-CSI-RS resource is transmitted by using a same transmitter (TX) spatial filter.

Optionally, the number of SL-CSI-RS resources included in the SL-CSI-RS is determined in at least one of the following ways:

the number of SL-CSI-RS resources is indicated by the SCI; and the number of SL-CSI-RS resources is determined based on the total number of time units occupied by the SL-CSI-RS and the number of time units occupied by one SL-CSI-RS resource.

Optionally, the SL-CSI-RS includes at least one SL-CSI-RS resource, and the starting RE position of the at least one SL-CSI-RS resource is determined in at least one of the following ways:

the starting RE position of the first SL-CSI-RS resource in the at least one SL-CSI-RS resource is indicated by an SCI, and the starting RE positions of other SL-CSI-RS resources are cyclically shifted sequentially;

the starting RE position of each SL-CSI-RS resource in the at least one SL-CSI-RS resource is separately indicated by the SCI;

the starting RE position of the first SL-CSI-RS resource in the at least one SL-CSI-RS resource is determined based on at least one of a first UE identity (ID), a second UE ID, an index of a time unit where the SL-CSI-RS resource is located, the index of the SL-CSI-RS resource and a decimal value of cyclic redundancy check (CRC) of the SCI, and the starting RE positions of other SL-CSI-RS resources are cyclically shifted sequentially; and the starting RE position of each SL-CSI-RS resource in the at least one SL-CSI-RS resource is determined based on at least one of the first UE ID, the second UE ID, the index of the time unit where the SL-CSI-RS resource is located, the index of the SL-CSI-RS resource and the decimal value of CRC of the SCI.

Optionally, the priority of the SL-CSI-RS is determined by at least one of the following:

a predefined priority value;

a priority value configured for each resource pool; and the priority of data transmitted to the second UE by the first UE.

Optionally, the 1st-stage SCI or 2nd-stage SCI associated with the SL-CSI-RS indicates at least one of the following information related to the SL-CSI-RS:

the index of an SL-CSI-RS resource set;

the index of an SL-CSI-RS resource;

the index of the first SL-CSI-RS resource among a plurality of SL-CSI-RS resources;

a transmission configuration indicator (TCI) of the SL-CSI-RS resource;

the TCI of the first SL-CSI-RS resource among the plurality of SL-CSI-RS resources;

the beam ID of the SL-CSI-RS resource;

the beam ID of the first SL-CSI-RS resource among the plurality of SL-CSI-RS resources;

the starting RE position of the SL-CSI-RS resource;

the starting RE position of the first SL-CSI-RS resource among the plurality of SL-CSI-RS resources;

whether the plurality of SL-CSI-RS resources are transmitted by using a same TX spatial filter;

the number of time units occupied by one SL-CSI-RS resource;

the number of SL-CSI-RS resources included in the scheduled SL-CSI-RS;

the frequency domain density of the SL-CSI-RS resources;

whether the SL-CSI-RS resources are repeated on REs;

whether the SL-CSI-RS resources are repeated on time units;

the number of repetitions of the SL-CSI-RS on time units;

the triggering of measurement reporting based on the SL-CSI-RS;

the triggering of reporting of at least one of a plurality of measurement quantities based on the SL-CSI-RS;

the ID of at least one second UE that performs measurement reporting; and the priority of the SL-CSI-RS.

Optionally, the 1st-stage SCI format for scheduling the SL-CSI-RS has the same total number of load bits as the 1st-stage SCI format for scheduling a physical sidelink shared channel (PSSCH).

Optionally, the 1st-stage SCI format for scheduling the SL-CSI-RS and the 1st-stage SCI format for scheduling a PSSCH are distinguished in at least one of the following ways:

the 1st-stage SCI contains a 1-bit indication field for indicating that the 1st-stage SCI is used to schedule the PSSCH or the SL-CSI-RS; and if at least one indication field in the 1st-stage SCI is a predetermined value, the 1st-stage SCI is used to schedule the SL-CSI-RS; otherwise, the 1st-stage SCI is used to schedule the PSSCH.

Optionally, the reporting a measurement result based on the SL-CSI-RS to the first UE includes:

reporting the measurement result based on the SL-CSI-RS to the first UE by a medium access control control element (MAC CE) and/or a physical sidelink feedback channel (PSFCH).

Optionally, the measurement result reported by the MAC CE includes at least one of the following information:

a measurement quantity of a specific SL-CSI-RS resource;

the largest value among the measurement quantities of a plurality of SL-CSI-RS resources, and the index of its corresponding SL-CSI-RS resource;

at least two largest values among the measurement quantities of a plurality of SL-CSI-RS resources, and the indexes of their corresponding SL-CSI-RS resources;

values greater than a first threshold among the measurement quantities of a plurality of SL-CSI-RS resources, and the indexes of their corresponding SL-CSI-RS resources; and the largest value among the measurement quantities of a plurality of SL-CSI-RS resource sets, the index of the corresponding SL-CSI-RS resource set, and the index of its corresponding SL-CSI-RS resource.

Optionally, the reporting a measurement result based on the SL-CSI-RS to the first UE by a PSFCH includes at least one of the following ways:

feeding back first state information by the PSFCH if the measurement quantity is greater than or equal to a second threshold, feeding back second state information by the PSFCH if the measurement quantity is less than the second threshold and greater than or equal to a third threshold, or giving no feedback if the measurement quantity is less than the third threshold;

feeding back first state information by the PSFCH if the measurement quantity is greater than or equal to a fourth threshold, or feeding back second state information by the PSFCH if the measurement quantity is less than the fourth threshold; and feeding back first state information by the PSFCH if the measurement quantity is greater than or equal to a fifth threshold, or giving no feedback if the measurement quantity is less than the fifth threshold.

Optionally, at least one of the first threshold, the second threshold, the third threshold, the fourth threshold, the fifth threshold, the sixth threshold, the seventh threshold, the eighth threshold, the ninth threshold, the tenth threshold and the eleventh threshold is determined in at least one of the following ways:

a predefined value; and being configured by a PC5 RRC signaling by the first UE.

Optionally, the measurement quantity includes at least one of the following:

layer 1 reference signal received power;

layer 1 signal to interference plus noise ratio; and channel state information.

Optionally, the PSFCH resource for reporting is determined based on at least one of the index of the time unit where the SL-CSI-RS is located, an index of a starting sub-channel of the SL-CSI-RS and the number of sub-channels occupied by the SL-CSI-RS.

Optionally, the method further includes:

determining a group of PSFCH resources based on at least one of the index of the time unit where the SL-CSI-RS is located, the index of the starting sub-channel of the SL-CSI-RS and the number of sub-channels occupied by the SL-CSI-RS; and determining a PSFCH resource for reporting in the group of PSFCH resources based on at least one of the first UE ID, the second UE ID and the index of the SL-CSI-RS resource corresponding to the measurement result to be reported.

Optionally, the reporting a measurement result based on the SL-CSI-RS to the first UE by a PSFCH includes:

the SL-CSI-RS including a plurality of SL-CSI-RS resources, and feeding back first state information or second state information on a PSFCH resource corresponding to the largest value among measurement quantities of the plurality of SL-CSI-RS resources.

Optionally, the signaling for triggering measurement reporting is an SCI or an MAC CE.

Optionally, the signaling for triggering measurement reporting is an SCI, and the SL-CSI-RS for performing measurement by the second UE is an SL-CSI-RS scheduled by the SCI.

Optionally, the signaling for triggering measurement reporting is an MAC CE, and the SL-CSI-RS for performing measurement by the second UE is at least one of the following:

an SL-CSI-RS transmitted most recently before the MAC CE;

an SL-CSI-RS transmitted in a first preset time window before the MAC CE;

an SL-CSI-RS transmitted most recently after the MAC CE; and an SL-CSI-RS transmitted in a second preset time window after the MAC CE.

Optionally, the method further includes:

within a latency boundary after receiving the signaling for triggering measurement reporting transmitted by the first UE, reporting a measurement result based on the SL-CSI-RS to the first UE, the value of the latency boundary being configured by a PC5 RRC signaling by the first UE.

Optionally, the method further includes:

if the second UE is configured with a resource allocation mode 1, upon receiving the signaling for triggering measurement reporting transmitted by the first UE, triggering a scheduling request.

In accordance with another aspect of embodiments of the present disclosure, there is provided a method executed by a first UE in a communication system, comprising:

transmitting an SL-CSI-RS scheduled by an SCI to a second UE, so that the second UE performs measurement based on the SL-CSI-RS;

transmitting a signaling for triggering measurement reporting to the second UE; and receiving a measurement result based on the SL-CSI-RS reported by the second UE, wherein the SL-CSI-RS transmission is standalone.

In accordance with still another aspect of embodiments of the present disclosure, there is provided a user equipment, including:

a transceiver, which is configured to transmit and receive signals; and a processor, which is coupled to the transceiver and configured to execute the method executed by a UE provided in embodiments of the present disclosure.

In accordance with yet another aspect of embodiments of the present disclosure, there is provided a computer-readable storage medium, having computer programs stored thereon that, when executed by a processor, implement the method executed by a UE provided in embodiments of the present disclosure.

In accordance with yet another aspect of embodiments of the present disclosure, there is provided a computer program product, including computer programs that, when executed by a processor, implement the method executed by a UE provided in embodiments of the present disclosure.

In the sidelink communication method and the user equipment provided in embodiments of the present disclosure, a second UE receives an SL-CSI-RS scheduled by an SCI transmitted by a first UE, performs measurement based on the SL-CSI-RS, and reports, upon receiving a signaling for triggering measurement reporting transmitted by the first UE, a measurement result based on the SL-CSI-RS to the first UE, wherein the SL-CSI-RS transmission is standalone. Thus, the measurement and reporting of sidelink communication are realized, thereby facilitating beam management of sidelink communication in an FR2 frequency band.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical solutions in the embodiments of the present disclosure more clearly, the accompanying drawings to be used in the description of the embodiments of the present disclosure will be briefly illustrated below.

FIG. 11 illustrates a schematic diagram of the SL-CSI-RS including a plurality of SL-CSI-RS resources in a slot according to an embodiment of the present disclosure;

FIG. 12 illustrates a schematic diagram of determining the number of time units occupied by the SL-CSI-RS or the number of SL-CSI-RS resources according to an embodiment of the present disclosure;

Figure 13:
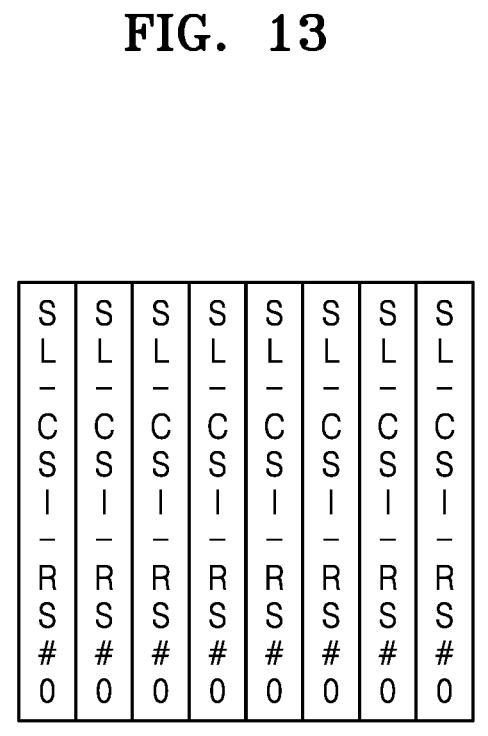

FIG. 13 illustrates a schematic diagram of the SL-CSI-RS including one SL-CSI-RS resource in a slot according to an embodiment of the present disclosure;

DETAILED DESCRIPTION

Figure 1:
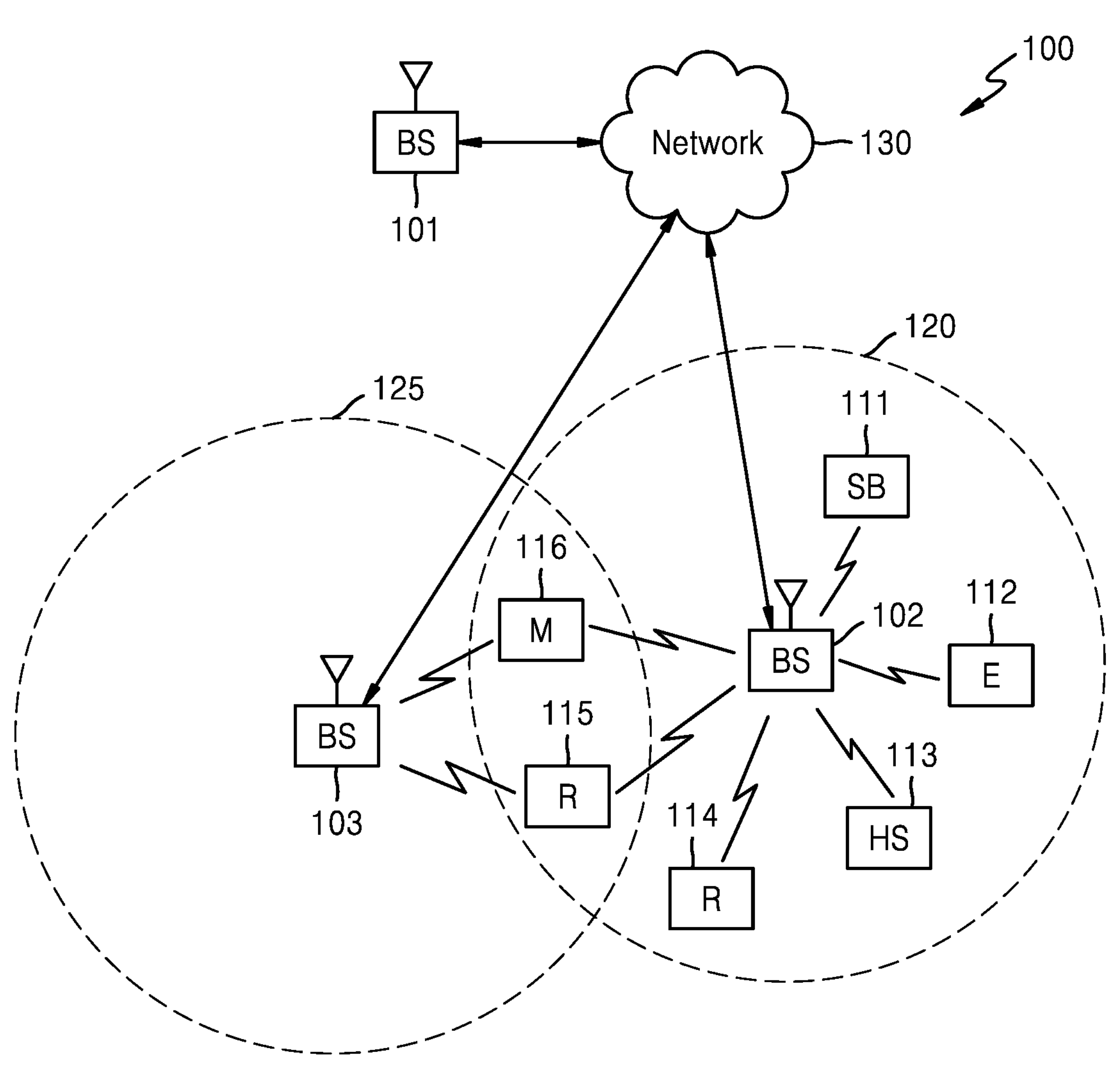
FIG. 1 illustrates a schematic diagram of an overall structure of a wireless network according to an embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (COMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

In a fifth-generation mobile communication (5G) new radio (NR) system, the current sidelink communication is only directed to a low frequency band (i.e., an FR1 frequency band with carrier frequency ranging from 450 MHz to 6,000 MHz). Due to the serious shortage of spectrum resources of the FR1, it is necessary to support a high frequency band (i.e., an FR2 frequency band with carrier frequency ranging from 24,250 MHz to 52,600 MHz) in the Rel-18 release. However, the current sidelink communication does not support the FR2.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
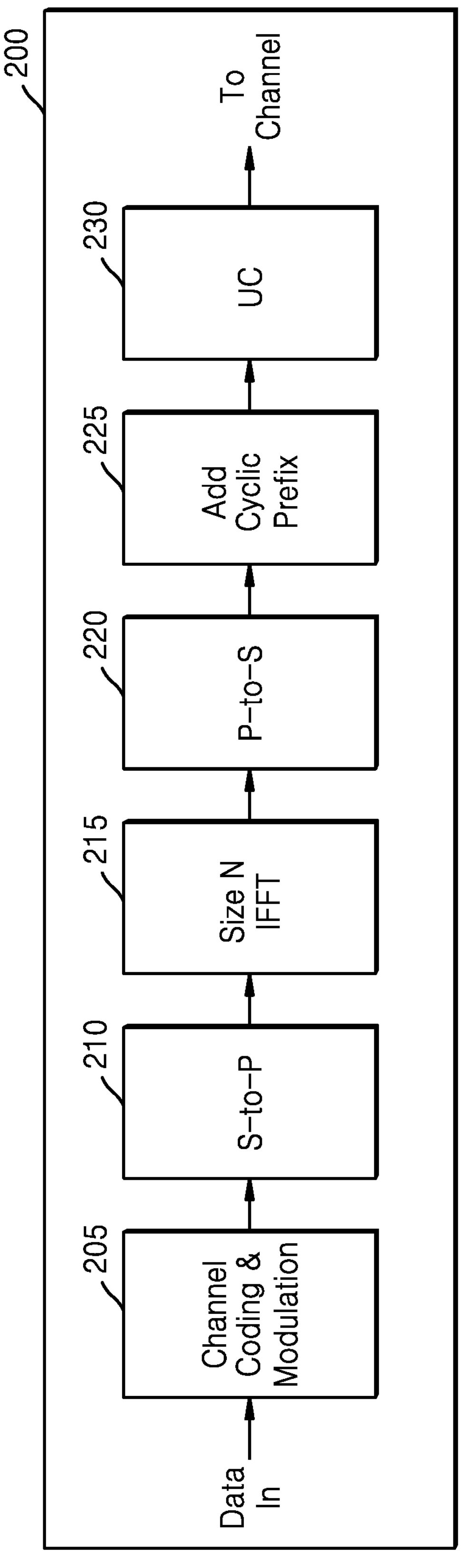
FIG. 2A illustrates a schematic diagram of a transmission path according to an embodiment of the present disclosure.
Figure 2B:
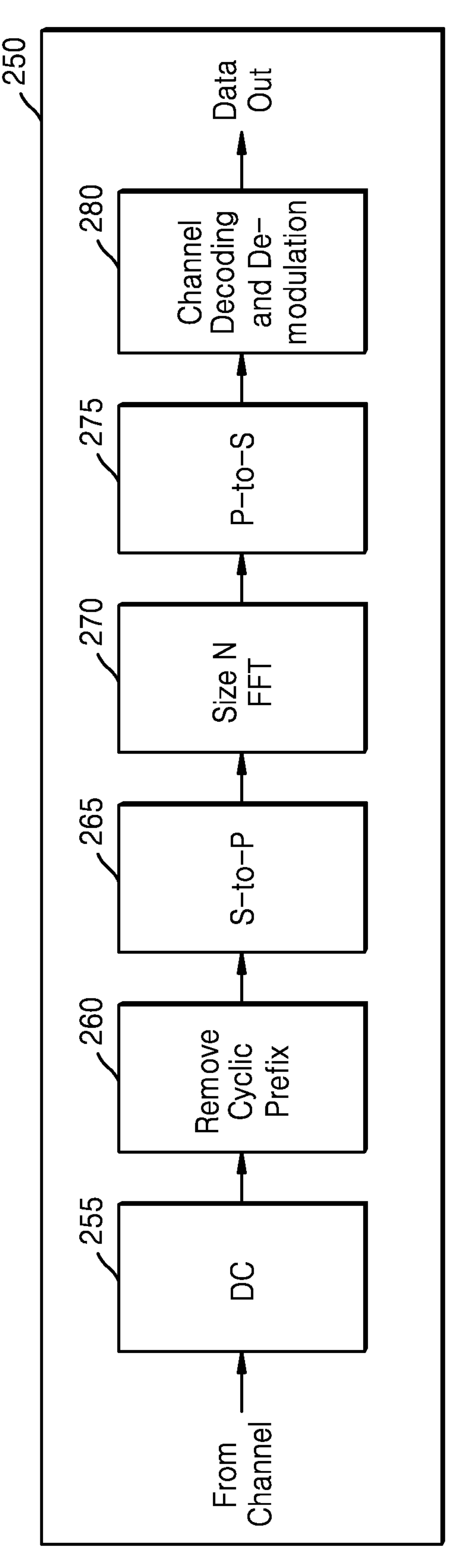
FIG. 2B illustrates a schematic diagram of a reception path according to an embodiment of the present disclosure.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing by the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
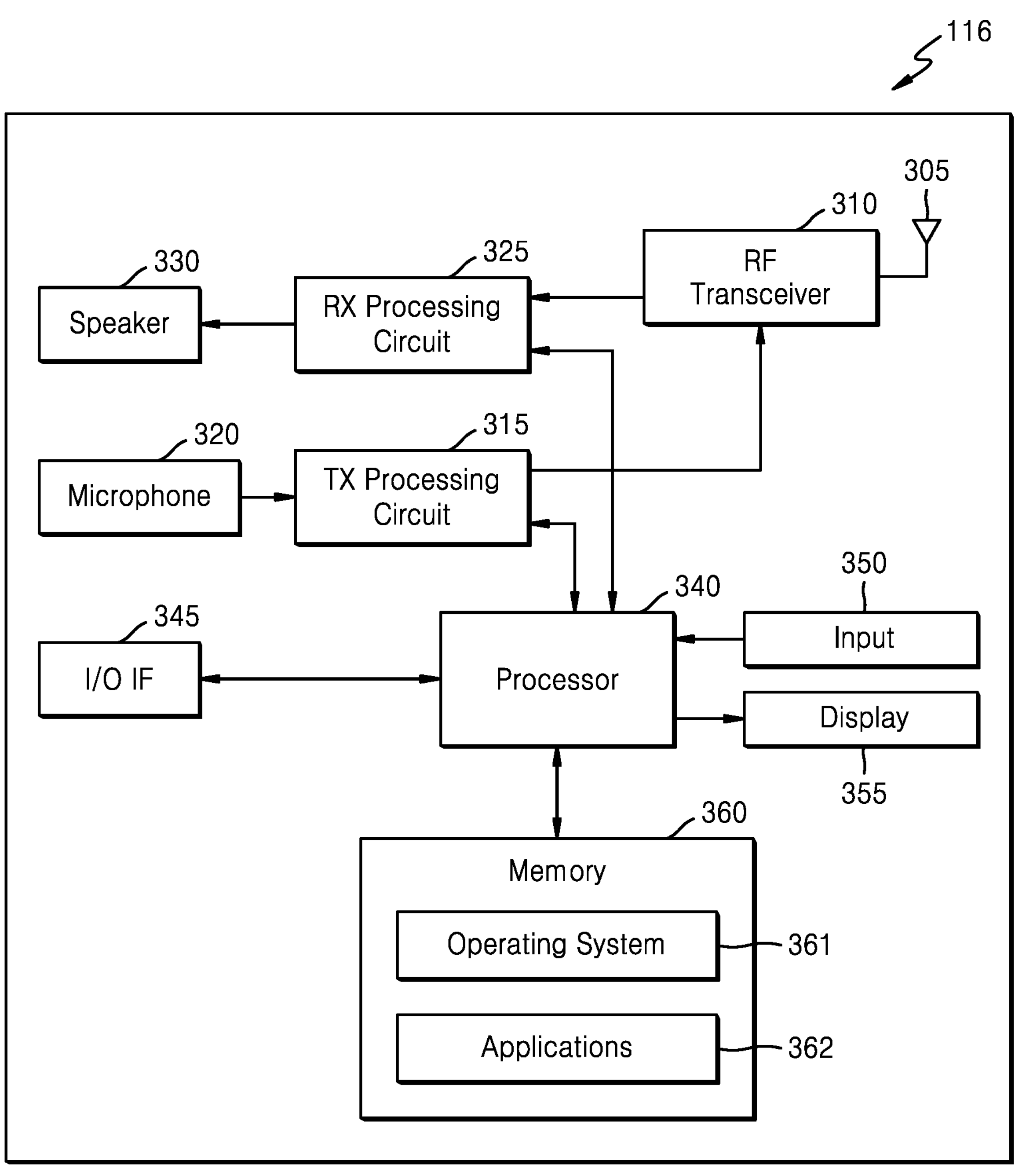
FIG. 3A illustrates a schematic structure diagram of a UE according to an embodiment of the present disclosure.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals by the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
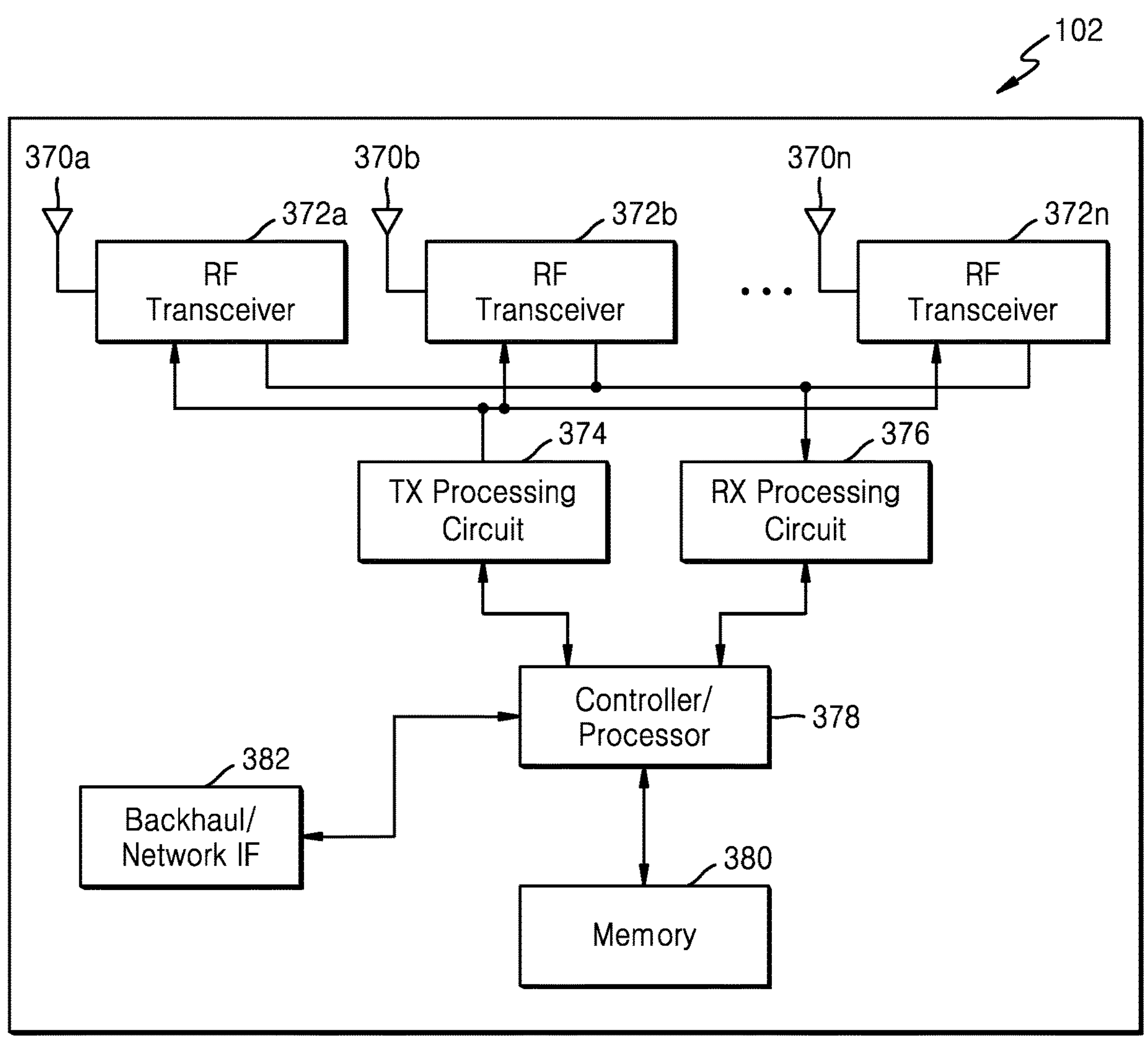
FIG. 3B illustrates a schematic structure diagram of a base station according to an embodiment of the present disclosure.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals by the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed by a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems by a backhaul connection or by a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs by wired or wireless backhaul connections. When gNB 102 is implemented as an access point, the backhaul or network interface 382 can allow gNB 102 to communicate with a larger network, such as the Internet, by a wired or wireless local area network or by a wired or wireless connection. The backhaul or network interface 382 includes any suitable structure that supports communication by a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In a communication system, the communication interface between a network base station and a UE is called a UU interface, and the UE performs data transmission with the network by the UU interface. Two UEs having communication requirements may access the same network by their respective UU interfaces and realize communication based on the data transfer in the network.

However, in a sidelink communication system, two terminals (UEs) that are close to each other can communicate directly, without transferring data by the network base station. The wireless link between two UEs is called a sidelink (SL), and the communication interface between two UEs is called a PC5 interface.

In the sidelink communication system, three communication modes are supported, i.e., broadcasting, multicasting and unicasting. Broadcasting means that a UE transmits data to all surrounding UEs, multicasting means that a UE transmits data to a specific group of surrounding UEs, and unicasting means that a UE transmits data to a specific surrounding UE. For unicasting, two UEs will establish a PC5 RRC connection to control the physical transmission of the underlying layer. The current sidelink communication system mainly has the following physical channels/signals: physical sidelink broadcast channels (PSBCHs), physical sidelink control channels (PSCCHs), physical sidelink shared channels (PSSCHs), physical sidelink feedback channels (PSFCHs), and sidelink channel state information reference signals (SL-CSI-RSs).

PSBCHs are used to synchronize and indicate important broadcast information. PSCCHs are used to indicate the resource allocation of PSSCHs (including reserved resources for the next PSSCH transmission), transmission parameters (e.g., modulation coding schemes (MCSs), demodulation reference signals (DMRSs) or other related information) and other information (e.g., priority, PSFCH resource overhead, etc.). PSSCHs are used to carry data. PSFCHs are used to feed back the decoding results of PSSCHs (including acknowledgement (ACK) of successful decoding and negative acknowledgement (NACK) of unsuccessful decoding). SL-CSI-RSs are used for channel estimation. The current sidelink communication system only supports aperiodic SL-CSI-RSs, which are always transmitted together with PSSCHs, that is, the SL-CSI-RSs transmission is not standalone.

The current sidelink communication is only directed to an FR1 frequency band. Due to the serious shortage of spectrum resources of the FR1, it is desirable to support sidelink communication in an FR2 frequency band. FR2 communication mainly differs from FR1 communication in that FR2 communication realizes transmission by using directional beams, that is, all channels/signals are transmitted in a specific beam direction, in order to gather the transmitting power in a certain direction to improve the signal power at the receiving end, thus improving the coverage. Due to the transmission characteristics of directional beams, beam management is essential. Beam management mainly includes the following aspects: initial beam paring, beam refinement, beam measurement and reporting, beam indication and switching, and beam failure detection and beam failure recovery. Since the current sidelink communication does not support FR2, details about beam management in sidelink communication are not clear. Embodiments of the present disclosure mainly provide technical details about measurement and reporting in sidelink communication.

The technical solutions in embodiments of the present disclosure and the technical effects achieved by the technical solutions in the present disclosure will be explained below by describing several exemplary implementations. It should be noticed that the following implementations can be referred to, learned from or combined with each other, and the same terms, similar features and similar implementation steps in different implementations will not be repeatedly described.

Figure 4:
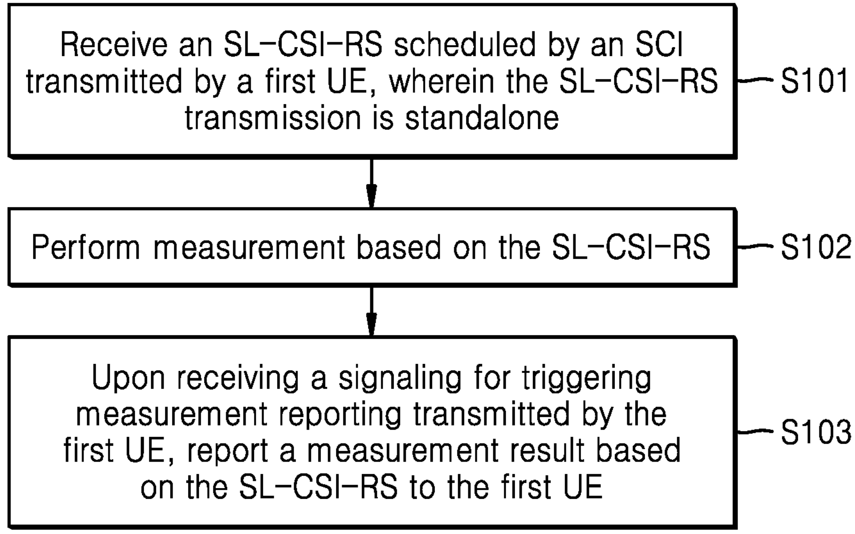
FIG. 4 illustrates a flowchart of a method executed by a second UE according to an embodiment of the present disclosure.

An embodiment of the present disclosure provides a method executed by a second UE in a communication system. As shown in FIG. 4, the method includes the following steps.

In step S101, an SL-CSI-RS scheduled by sidelink control information (SCI) transmitted by a first UE is received.

In step S102, measurement is performed based on the SL-CSI-RS.

In step S103, upon receiving a signaling for triggering measurement reporting transmitted by the first UE, a measurement result based on the SL-CSI-RS is reported to the first UE.

The SL-CSI-RS transmission is standalone.

In some embodiments of the present disclosure, the UE that transmits data is called a first UE or transmission UE (TX UE), the UE that receives data is called a second UE or reception UE (RX UE), and a PC5 RRC connection will be established between the TX UE and the RX UE. The identity or identifier (ID) of the TX UE is called a first UE ID or source ID, and the ID of the RX UE is called a second UE ID or destination ID. The TX UE transmits PSCCHs and/or PSSCHs to the RX UE, and the RX UE feeds back PSFCHs to the TX UE. In addition, in order to support beam management, the TX UE transmits a sidelink reference signal used for beam measurement to the RX UE, and the RX UE reports the measurement result to the TX UE, considering that beam measurement and reporting are essential in the beam management process.

Specifically, after the TX UE and the RX UE complete the initial beam pairing process, the TX UE and the RX UE can communicate by the initially paired beam. In order to maintain the communication quality of the paired beams, the RX UE measures and reports the sidelink reference signal used for beam measurement, and the TX UE can further refine or switch the transmitting beam according to the measurement result reported by the RX UE, so that the TX UE and the RX UE can communicate by the best paired beam. By taking refining the transmitting beam as an example, the initially paired beam may be a wide beam, and the refined beam may be a narrow beam, so that beam refinement can further improve the communication quality. In addition, the RX UE can also realize the refinement of the receiving beam by measuring the repetition of reference signals corresponding to the same beam direction.

In the communication system based on the UU interface, beam measurement is based on the synchronization signal block (SSB) and/or channel state information reference signal (CSI-RS). Similarly, in the sidelink communication system based on the PC5 interface, the sidelink synchronization signal block (SL-SSB) and the SL-CSI-RS can also be used for beam measurement. In some embodiments of the present disclosure, beam measurement and reporting based on the SL-CSI-RS is mainly adopted. That is, the SL-CSI-RS mentioned in some embodiments of the present disclosure is used for the purpose of beam measurement. The measurement based on the SL-CSI-RS may be called beam measurement, and the measurement reporting based on the SL-CSI-RS may be called beam reporting or beam measurement reporting.

In the current sidelink system, the existing SL-CSI-RS is only used for channel state information (CSI) measurement, and the SL-CSI-RS is always transmitted along with the PSSCH. The existing SL-CSI-RS is not suitable for beam measurement because the SL-CSI-RS for beam measurement should support transmission in multiple beam directions and the PSSCH is always transmitted based on the best transmitting beam. Therefore, the SL-CSI-RS for beam measurement is not suitable for being transmitted together with the PSSCH, and it is desirable to enhance the existing SL-CSI-RS to support separate transmission. In some embodiments of the present disclosure, the SL-CSI-RS for beam measurement refers to an SL-CSI-RS with the separate transmission characteristic.

In the communication system based on the UU interface, beam measurement may be based on periodic, semi-persistent and aperiodic CSI-RSs. However, in the sidelink communication system, it is difficult to support periodic and semi-persistent SL-CSI-RSs. In the sidelink resource allocation mode 2 (Mode 2), the sidelink resources for physical channel transmission are competitively shared by a plurality of UEs, so it is difficult for UEs to preempt periodic sidelink resources, and the periodic reservation of resources will also affect the resource allocation of other UEs. Therefore, it is more reasonable to support periodic SL-CSI-RSs. That is, in some embodiments of the present disclosure, the occasion when the UE transmits the SL-CSI-RS may not be periodic, entirely depending on the implementation of the TX UE.

Similar to the existing scheduling of PSSCHs by PSCCHs, the transmission of the aperiodic SL-CSI-RS may also be based on PSCCH scheduling, that is, a slot includes a PSCCH and the SL-CSI-RS indicated by the PSCCH. The PSCCH indicates the frequency resource of the SL-CSI-RS and other control information.

In some embodiments of the present disclosure, the beam index of the SL-CSI-RS may be determined by the PSCCH. The beam index of the PSCCH may be indicated by a medium access control (MAC) control element (CE), and the beam of the scheduled SL-CSI-RS may be different from the beam of the PSCCH. For example, the beam index of the SL-CSI-RS is indicated by the PSCCH.

In some embodiments of the present disclosure, the beam index of the SL-CSI-RS may be determined at least one of the index of the associated SL-SSB and the index of the associated SL-CSI-RS resource for initial beam acquisition. The beam index of the PSCCH or SL-CSI-RS refers to the index of the associated reference signal for initial beam acquisition. The "associated" means that the PSCCH or SL-CSI-RS and the associated reference signal for initial beam acquisition are transmitted by the same transmitting beam, so that the beam index of the PSCCH or SL-CSI-RS can be represented by the index of the associated reference signal. For example, if the PSBCH is used for initial beam acquisition, the beam index of the PSCCH or SL-CSI-RS refers to the index of the associated SL-SSB; and, if the SL-CSI-RS is used for initial beam acquisition, the beam index of the PSCCH refers to the index of the associated SL-CSI-RS for initial beam acquisition, and the beam index of the SL-CSI-RS for beam measurement refers to the index of the associated SL-CSI-RS resource for initial beam acquisition.

In some embodiments of the present disclosure, the beam index of the SL-CSI-RS may be determined by a sidelink transmission configuration indicator (SL-TCI) state. That is, the beam index of the PSCCH or SL-CSI-RS may also refer to the SL-TCI state. The PC5 RRC configures for each SL-TCI state the index of the associated reference signal for initial beam acquisition, or the PC5 RRC configures for each SL-TCI state the index of the associated reference signal for beam measurement. The PC5 RRC also configures for each SL-TCI state the quasi-colocated (QCL) type between the SL-TCI state and the associated reference signal. QCL means that the large-scale parameter of the wireless channel experienced by one signal can be inferred from the wireless channel experienced by another signal. The large-scale parameters include latency spread, average latency, Doppler spread, Doppler shift, average gain, Receiver (RX) spatial parameter, etc. Each QCL type specifies that the wireless channels experienced by two associated signals have which same large-scale parameters. Similar to the communication system based on the UU interface, the beam index of the PSCCH or SL-CSI-RS is represented by the SL-TCI state.

It is to be noted that, the beam index of the PSCCH or SL-CSI-RS in some embodiments of the disclosure is used to represent the beam direction, and the "beam index" may have other names. For example, the "beam index" may be "beam ID", "index of the associated SL-SSB", "index of the associated SL-CSI-RS resource for initial beam acquisition", "SL-TCI", etc. In addition, for the SL-CSI-RS, when a plurality of SL-CSI-RS resources are configured, the PC5-RRC configures a resource index for each SL-CSI-RS, and the beam ID (i.e., the beam index of the SL-CSI-RS may also be determined by the beam ID indicated by an MAC CE or PC5-RRC), the index of the associated SL-SSB, the index of the associated SL-CSI-RS resource for initial beam acquisition or the SL-TCI state is indicated to each SL-CSI-RS by an MAC CE or PC5-RRC. Therefore, the index of the SL-CSI-RS may also represent the beam direction of the SL-CSI-RS. In addition, the "beam index of the SL-CSI-RS" may be interchanged with the "index of the SL-CSI-RS resource".

As can be seen from the above description, the TX UE may transmit an aperiodic SL-CSI-RS for beam measurement to the RX UE. Optionally, the SL-CSI-RS may be scheduled by the SCI for standalone transmission. The RX UE determines the transmission bandwidth size and position of the SL-CSI-RS based on the SCI, and the physical layer of the RX UE performs measurement on the received SL-CSI-RS. Upon receiving a signaling for triggering measurement reporting transmitted by the TX UE, the RX UE reports a measurement result to the TX UE. That is, the specific process on the RX UE side may be as shown by the steps of FIG. 4. The SL-CSI-RS scheduled by the SCI transmitted by the first UE in the step S101 is an SL-CSI-RS with the separate transmission characteristic, and the SL-CSI-RS is used for beam measurement.

The standalone SL-CSI-RS transmission means that the SL-CSI-RS is not bound to the PSSCH for transmission, so that the existing time-frequency domain resources for PSSCH transmission can all be used for SL-CSI-RS transmission. In the existing sidelink system, the PSCCH and the PSSCH may be completely time-multiplexed (i.e., being not frequency-multiplexed); or, during the time division multiplexing, the PSSCH may also be frequency-multiplexed with the PSCCH on PSCCH symbols. The multiplexing mode depends on the configuration of the resource pool. Since the beam used by the SL-CSI-RS may be different from the beam used by the PSCCH, the SL-CSI-RS cannot be multiplexed with the PSCCH in an orthogonal frequency division multiplexing (OFDM) symbol. That is, in some embodiments of the present disclosure, the standalone SL-CSI-RS transmission is (completely) time-multiplexed with the PSCCH, that is, the standalone SL-CSI-RS transmission is (completely) time-multiplexed with the 1st-stage SCI. This multiplexing mode may be realized by the configuration of the resource pool.

The resource allocation of the aperiodic SL-CSI-RS may adopt the same resource allocation method as the PSSCH. That is, the used frequency domain resources and the related information are indicated by the SCI. The occupied time domain symbols may be defaulted as all symbols other than other transmission symbols in the slot, and the other transmission symbols include automatic gain control (AGC), PSCCH, PSFCH, guard period (GP) or other symbols.

In the existing communication system, the 2nd-stage SCI is transmitted by PSSCH piggyback, that is, the 2nd-stage SCI is mapped to some resource elements (REs) of the PSSCH resources. In the SL FR2 system, the 2nd-stage SCI may be transmitted by standalone SL-CSI-RS transmission piggyback, that is, the 2nd-stage SCI is mapped to some REs of the standalone SL-CSI-RS transmission resources. In other words, the SL-CSI-RS carries the 2nd-stage SCI in a piggyback manner, and the modulated and encoded 2nd-stage SCI is mapped to some resources of the SL-CSI-RS.

In addition, the 2nd-stage SCI and the 1st-stage SCI (i.e., PSCCH) use the same beam. Similarly, the SL-CSI-RS and the 2nd-stage SCI are (completely) time-multiplexed. For example, the 2nd-stage SCI completely occupies first N time units of time domain resources of the SL-CSI-RS, where N is an integer greater than or equal to 1.

It is to be noted that, in some embodiments of the present disclosure, one time unit may refer to one OFDM symbol or one slot including a plurality of OFDM symbols. In addition, the "OFDM symbol" may be called "symbol" for short, and the same content will not be repeated hereinafter.

Figure 5A:
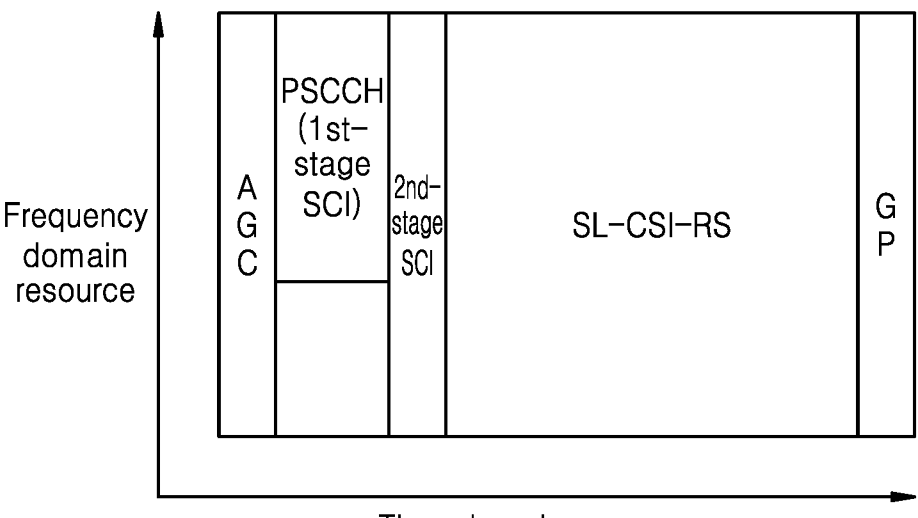
FIG. 5A illustrates a schematic diagram of time division multiplexing of an SL-CSI-RS and 2nd-stage SCI according to an embodiment of the present disclosure.
Figure 5B:
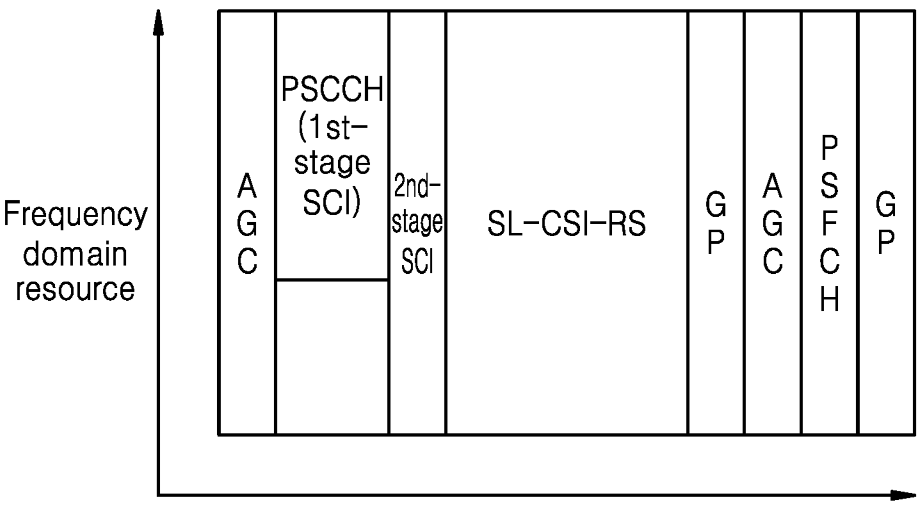
FIG. 5B illustrates another schematic diagram of time division multiplexing of an SL-CSI-RS and 2nd-stage SCI according to an embodiment of the present disclosure.

As an example, as shown in FIGS. 5A and 5B, the 2nd-stage SCI completely occupies first one or more symbols of the SL-CSI-RS resource, where FIG. 5A corresponds to a situation where the slot does not include PSFCH symbols, and FIG. 5B corresponds to a situation where the slot includes PSFCH symbols. In addition, other time units further include AGC, PSCCH (1st-stage SCI), GP, etc.

In some embodiments of the present disclosure, for the flexibility of resource scheduling, the number of symbols separately occupied by the 2nd-stage SCI may be variable, and the number of time units (i.e., the number of symbols) completely occupied by the 2nd-stage SCI is determined in at least one of the following ways.

(1) The number of time units occupied by the 2nd-stage SCI is indicated by the 1st-stage SCI. For example, the number of symbols separately occupied by the 2nd-stage SCI is indicated by the 1st-stage SCI.

(2) The number of time units occupied by the 2nd-stage SCI is determined based on the number of sub-channels occupied by the SL-CSI-RS. That is, the number of symbols separately occupied by the 2nd-stage SCI is determined according to the number of sub-channels (transmission bandwidth size) occupied by the SL-CSI-RS resource. For example, if the number of sub-channels (transmission bandwidth size) occupied by the SL-CSI-RS is greater than a sixth preset threshold, the number of time units occupied by the 2nd-stage SCI is 1. For example, the 2nd-stage-SCI occupies the first OFDM symbol of the SL-CSI-RS resource. On the contrary, if the number of sub-channels (transmission bandwidth size) occupied by the SL-CSI-RS is less than or equal to the sixth threshold, the number of time units occupied by the 2nd-stage SCI is 2. For example, the 2nd-stage-SCI occupies first two OFDM symbols of the SL-CSI-RS resource. Alternatively, if the number of sub-channels (transmission bandwidth size) occupied by the SL-CSI-RS is less than or equal to a seventh threshold, the number of time units occupied by the 2nd-stage SCI is 3. For example, the 2nd-stage-SCI occupies first three OFDM symbols of the SL-CSI-RS resource. If the number of sub-channels (transmission bandwidth size) occupied by the SL-CSI-RS is greater than the seventh threshold and less than or equal to an eighth threshold, the number of time units occupied by the 2nd-stage-SCI is 2. For example, the 2nd-stage-SCI occupies first two OFDM symbol of the SL-CSI-RS resource. If the number of sub-channels (transmission bandwidth size) occupied by the SL-CSI-RS is greater than the eighth threshold, the number of time units occupied by the 2nd-stage SCI is 1. For example, the 2nd-stage-SCI occupies the first OFDM symbol of the SL-CSI-RS resource.

Figure 6A:
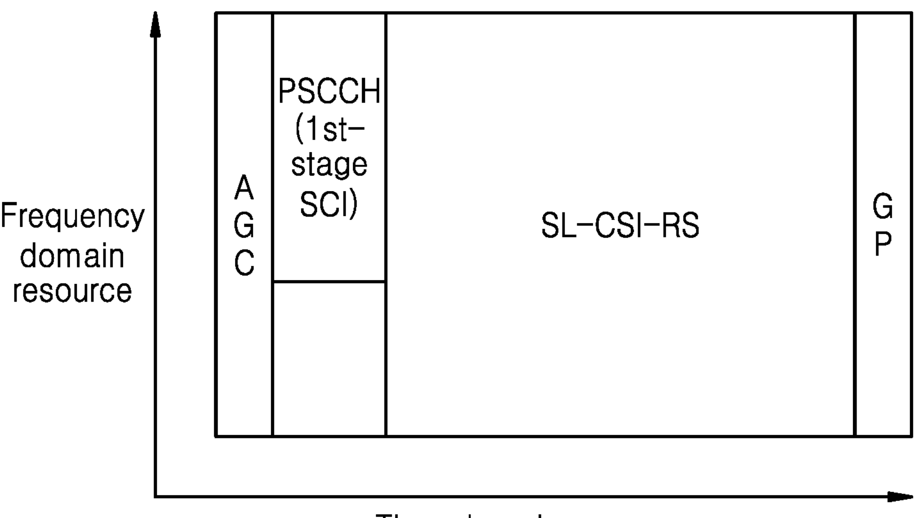
FIG. 6A illustrates a schematic diagram in which an SCI for scheduling an SL-CSI-RS does not include 2nd-stage SCI according to an embodiment of the present disclosure.
Figure 6B:
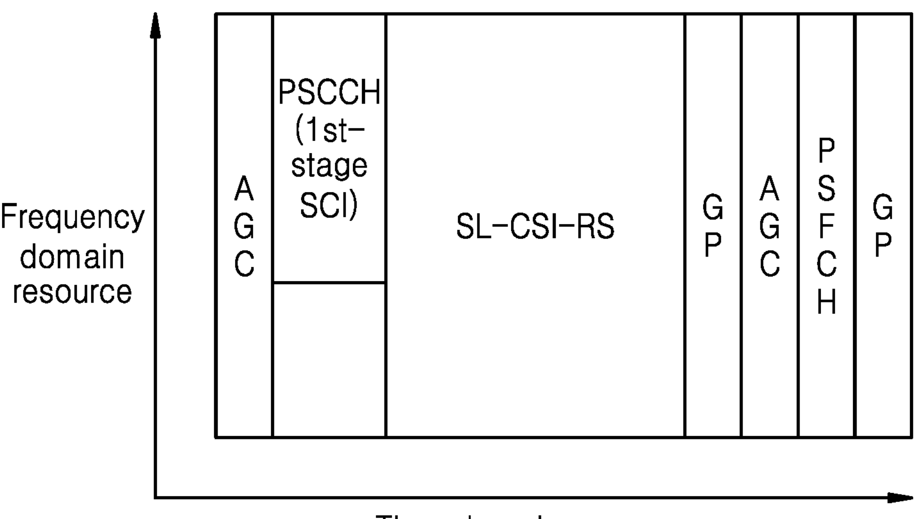
FIG. 6B illustrates another schematic diagram in which an SCI for scheduling an SL-CSI-RS does not include 2nd-stage SCI according to an embodiment of the present disclosure.

In some embodiments of the present disclosure, the SCI for scheduling the SL-CSI-RS may include the 1st-stage SCI (PSSCH) but not the 2nd-stage SCI, because the information to be indicated by the SCI for scheduling the SL-CSI-RS may be much less than that of the PSSCH and it is possible to use the 1st-stage SCI but not the 2nd-stage SCI. As an example, as shown in FIGS. 6A and 6B, FIG. 6A corresponds to a situation where the slot does not include PSFCH symbols, and FIG. 6B corresponds to a situation where the slot includes PSFCH symbols. In addition, other time units may also include AGC, GP, etc.

Figure 7A:
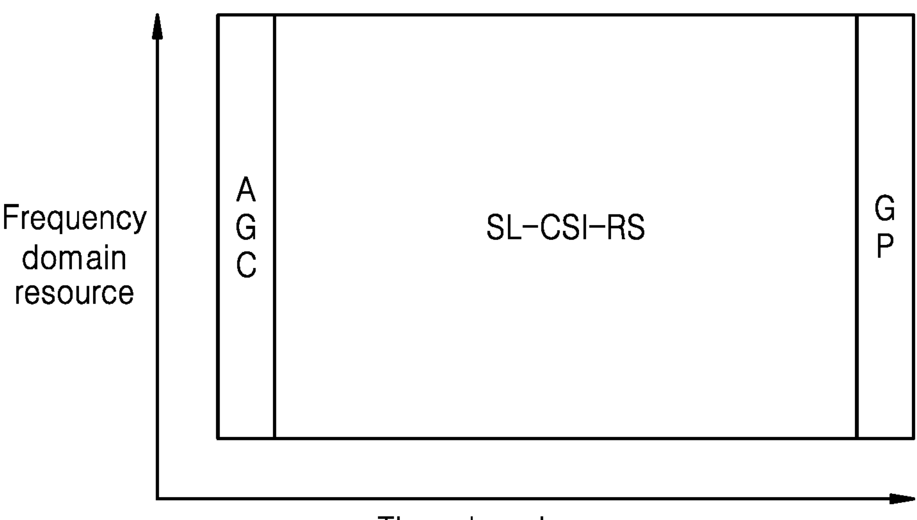
FIG. 7A illustrates a schematic diagram in which resources used for PSCCH transmission are also used for SL-CSI-RS transmission according to an embodiment of the present disclosure.
Figure 7B:
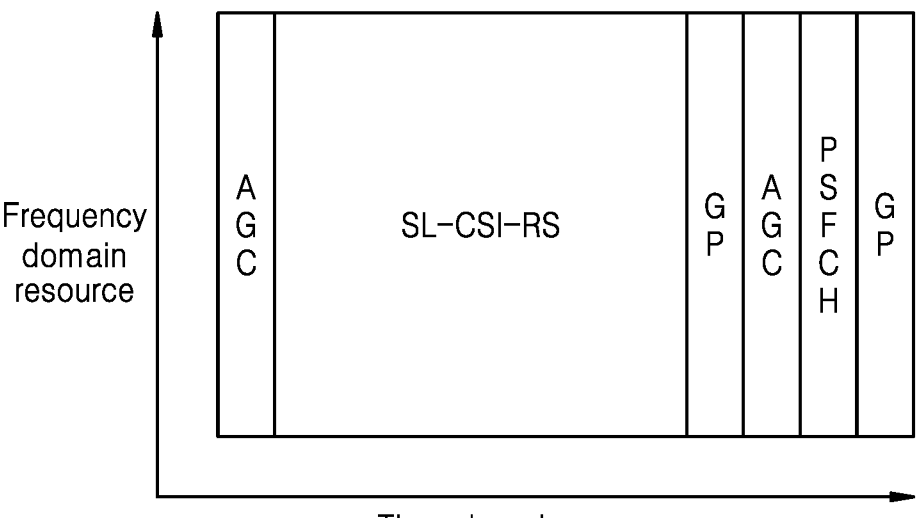
FIG. 7B illustrates another schematic diagram in which resources used for PSCCH transmission are also used for SL-CSI-RS transmission according to an embodiment of the present disclosure.

In some embodiments of the present disclosure, the TX UE may transmit a periodic SL-CSI-RS for beam measurement to the RX UE. The resource allocation, frequency domain resource, time domain starting position, period or the like of the periodic SL-CSI-RS may be configured to the RX UE by the TX UE by a PC5-RRC signaling. In the existing resource allocation method based on Mode 1, the base station may configure for the TX UE a periodic resource for SL-CSI-RS transmission; and, in the resource allocation method of Mode 2, the TX UE reserve a periodic resource for SL-CSI-RS transmission in a resource pool by sensing. This resource pool may be specific for SL-CSI-RS transmission, or this resource pool may be shared with PSCCH/PSSCH transmission. Since the time-frequency domain resource of the periodic SL-CSI-RS is configured to the RX UE, the SL-CSI-RS transmission does not need to include the SCI, and the resources originally corresponding to SCI transmission may be left blank (that is, nothing will be transmitted), or the resources originally corresponding to SCI transmission may also be used for SL-CSI-RS transmission. As an example, as shown in FIGS. 7A and 7B, FIG. 7A corresponds to a situation where the slot does not include PSFCH symbols, and FIG. 7B corresponds to a situation where the slot includes PSFCH symbols. In addition, other time units may also include AGC, GP, etc.

In the existing communication system, for the SL-CSI-RS with a single antenna port, the mapping pattern only occupies one OFDM symbol in time domain. In some embodiments of the present disclosure, the standalone SL-CSI-RS transmission resources may include a plurality of symbols in time domain. Specifically, the standalone SL-CSI-RS transmission includes at least one SL-CSI-RS resource, and each SL-CSI-RS is mapped to at least two consecutive time units. For example, the SL-CSI-RS may occupy all remaining symbols other than AGC, PSCCH, PSFCH, GP and 2nd-stage SCI in the slot, so it is desirable to map one SL-CSI-RS to multiple symbols.

Optionally, one SL-CSI-RS resource is mapped to at least two consecutive time units in at least one of the following ways.

Figure 8A:
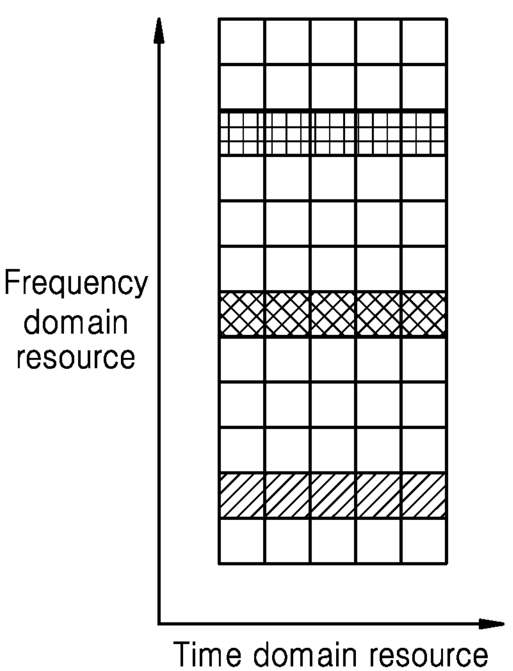
FIG. 8A illustrates a schematic diagram of repetitively mapping an SL-CSI-RS signal sequence in time domain according to an embodiment of the present disclosure.
Figure 8B:
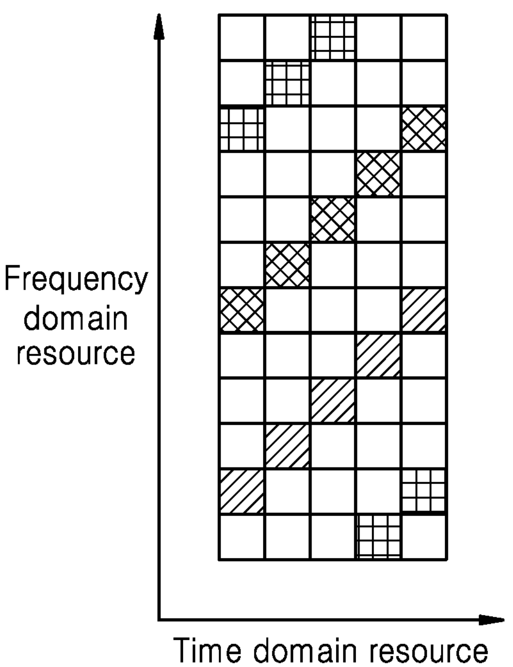
FIG. 8B illustrates a schematic diagram of repetitively mapping an SL-CSI-RS signal sequence in time domain according to an embodiment of the present disclosure.

(1) The one SL-CSI-RS is mapped to the at least two consecutive time units by repeating on time units. For example, one SL-CSI-RS signal sequence is mapped to more symbols by repeating in time domain. When repeating in time domain, the starting mapping RE position of each symbol may be kept the same; or, the starting mapping RE position of each subsequent symbol is sequentially shifted by a first preset number of REs, for example, being sequentially shifted by one RE. By taking a pattern in which the frequency domain density is 3 SL-CSI-RS REs per physical resource block (PRB) as an example, the repetition mode is as shown in FIGS. 8A and 8B. FIG. 8A corresponds to a situation where the starting RE position is kept the same on all symbols, and FIG. 8B corresponds to a situation where the starting RE position is cyclically shifted by one RE on different symbols.

(2) The one SL-CSI-RS resource is mapped to the at least two consecutive time units by cyclic shifting. For example, one SL-CSI-RS signal sequence is cyclically shifted and then mapped to other symbols. The difference from the above repetition on time units is that the signal sequence mapped to other symbols is a signal sequence obtained by cyclically shifting the signal sequence on the first symbol by a preset interval.

(3) The one SL-CSI-RS resource is mapped to the at least two consecutive time units by generating a longer SL-CSI-RS signal sequence, for example, being mapped to more symbols by generating a longer SL-CSI-RS signal sequence. The mapping mode may be mapping in time domain first and then in frequency domain, or mapping in frequency domain first and then in time domain. The starting mapping RE position on each symbol may be kept the same, or the starting mapping RE position on each symbol is sequentially shifted by a second preset number of REs.

In some embodiments of the present embodiment, one SL-CSI-RS resource (signal sequence) may be mapped to multiple time units (e.g., symbols). For example, one SL-CSI-RS resource (signal sequence) is mapped to more symbols by repeating on time units or generating a longer signal sequence, as described above. For the flexibility of resource allocation, the number of symbols occupied by each SL-CSI-RS resource may be variable.

Optionally, the number of time units occupied by one SL-CSI-RS resource is determined in at least one of the following ways:

(1) The number of time units occupied by one SL-CSI-RS resource is indicated by the SCI. For example, the number of symbols occupied by one SL-CSI-RS resource is indicated by the SCI. As an example, the SCI may indicate that the number of symbols occupied by one SL-CSI-RS resource is at least one of 1, 2, 4 or the maximum number of symbols that can be transmitted in a slot.

(2) The number of time units occupied by one SL-CSI-RS resource is determined based on the number of sub-channels occupied by the SL-CSI-RS. For example, the number of symbols occupied by one SL-CSI-RS resource is determined according to the number of sub-channels (transmission bandwidth size) occupied by the SL-CSI-RS. As an example, if the number of sub-channels (transmission bandwidth size) occupied by the SL-CSI-RS is less than or equal to a ninth threshold, the number of time units occupied by one SL-CSI-RS resource is 2. For example, one SL-CSI-RS resource occupies two symbols. If the number of sub-channels (transmission bandwidth size) occupied by the SL-CSI-RS is greater than the ninth threshold, the number of time units occupied by one SL-CSI-RS resource is 1. For example, one SL-CSI-RS resource occupies one symbol. Alternatively, if the number of sub-channels (transmission bandwidth size) occupied by the SL-CSI-RS is less than or equal to a tenth threshold, the number of time units occupied by one SL-CSI-RS resource is 3. For example, one SL-CSI-RS resource occupies three symbols. If the number of sub-channels (transmission bandwidth size) occupied by the SL-CSI-RS is greater than the tenth threshold and less than or equal to an eleventh threshold, the number of time units occupied by one SL-CSI-RS resource is 2. For example, one SL-CSI-RS resource occupies two symbols. If the number of sub-channels (transmission bandwidth size) occupied by the SL-CSI-RS is greater than the eleventh threshold, the number of time units occupied by one SL-CSI-RS resource is 1. For example, one SL-CSI-RS resource occupies one symbol.

Figure 12:
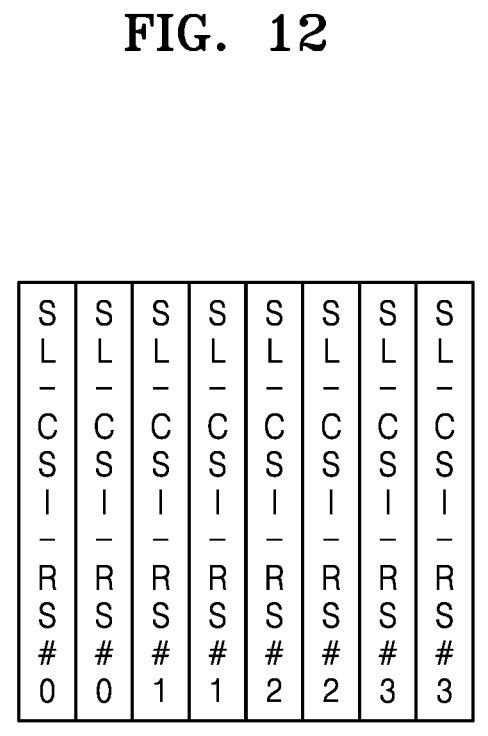

(3) The number of time units occupied by one SL-CSI-RS resource is determined by the total number of time units occupied by the SL-CSI-RS and the number of SL-CSI-RS resources included in the SL-CSI-RS. For example, the number of symbols occupied by one SL-CSI-RS resource is determined by the total number of symbols occupied by the SL-CSI-RS in a slot and the number of the included SL-CSI-RS resources. The total number of symbols may be determined based on the resource pool, and the number of resources may be determined by the indication of the SCI. As an example, as shown in FIG. 12, if the total number of symbols of the standalone SL-CSI-RS transmission is 8 and when the number of SL-CSI-RS resources included in a slot is indicated as 4 (i.e., resources {#0 to #3}) by the SCI, it can be determined that the number of symbols occupied by one SL-CSI-RS resource is 2.

In the existing communication system, for the SL-CSI-RS with a single antenna port, the mapping pattern is discrete in frequency domain, and the frequency domain density is fixed in such a way that one PRB has one SL-CSI-RS. In some embodiments of the present disclosure, the standalone SL-CSI-RS transmission resource may use all REs in frequency domain, that is, the SL-CSI-RS may be mapped to all of the allocated REs in at least one time unit. For example, one SL-CSI-RS is mapped to all REs in a symbol, that is, 12 REs of one PRB are all used for the SL-CSI-RS.

Optionally, the SL-CSI-RS may be mapped to all of the allocated REs in at least one time unit in at least one of the following ways.

Figure 9:
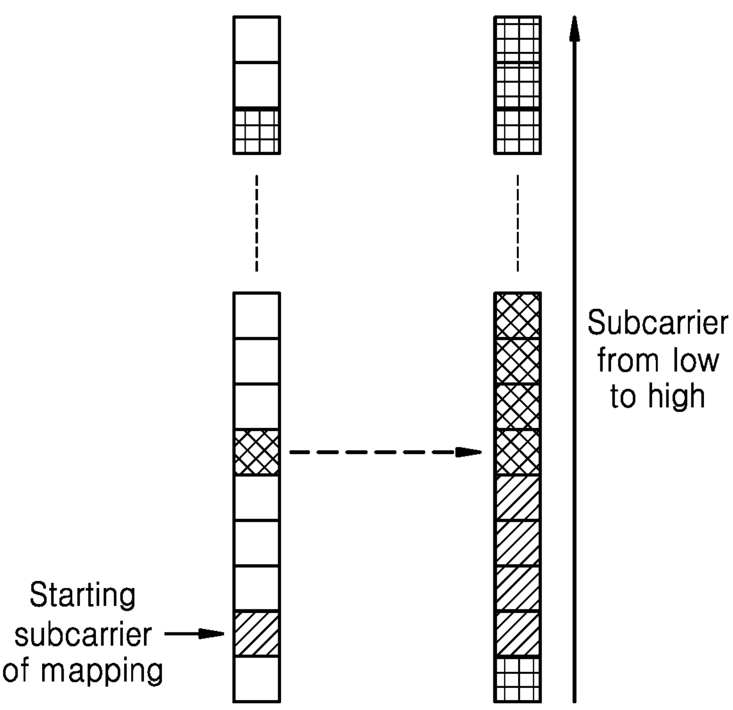
FIG. 9 illustrates a schematic diagram of repetitively mapping an SL-CSI-RS signal sequence in frequency domain according to an embodiment of the present disclosure.

(1) The SL-CSI-RS is mapped to all of the allocated REs in at least one time unit by repeating on REs. For example, one SL-CSI-RS is mapped to all REs in a symbol by repeating in frequency domain. By taking a pattern in which the frequency domain density is 3 SL-CSI-RS REs per PRB as an example, the repetition mode is as shown in FIG. 9. Each SL-CSI-RS RE is repetitively mapped to all REs before a next SL-CSI-RS RE.

(2) The SL-CSI-RS is mapped to all of the allocated REs in the at least one time unit by generating a longer SL-CSI-RS signal sequence. For example, the SL-CSI-RS is mapped to all REs in a symbol by generating a longer SL-CSI-RS signal sequence, that is, the frequency domain density of the SL-CSI-RS is increased to the maximum (the frequency domain is fully occupied).

Figure 10A:
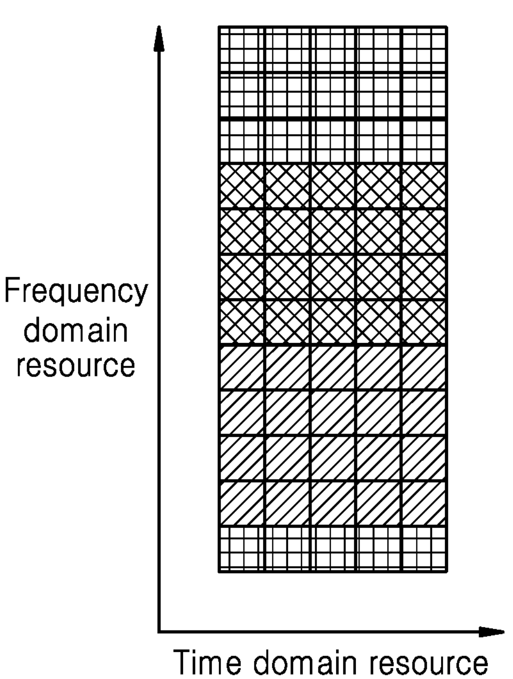
FIG. 10A illustrates a schematic diagram of repetitively mapping an SL-CSI-RS signal sequence in time domain and frequency domain according to an embodiment of the present disclosure.
Figure 10B:
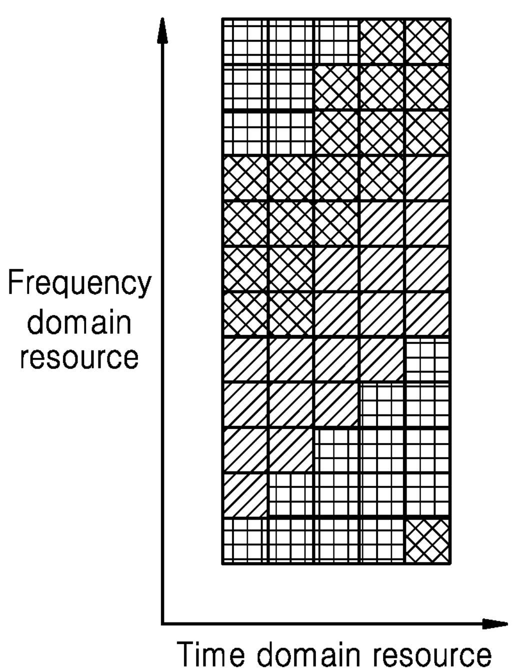
FIG. 10B illustrates a schematic diagram of repetitively mapping an SL-CSI-RS signal sequence in time domain and frequency domain according to an embodiment of the present disclosure.

In addition, one SL-CSI-RS signal sequence may be repetitively mapped in time domain and frequency domain, and the coverage of the SL-CSI-RS is boosted by energy accumulation, for example, as shown in FIGS. 10A and 10B, where FIG. 10A corresponds to a situation where the starting RE position is kept the same on all symbols, and FIG. 10B corresponds to a situation where the starting RE position is cyclically shifted by one RE on different symbols.

In some embodiments of the present disclosure, the standalone SL-CSI-RS transmission may also be kept discretely mapped in frequency domain. Similar to the CSI-RS in the communication system based on the UU interface, the frequency domain density of the SL-CSI-RS is configurable. Specifically, the SL-CSI-RS is mapped to part of the allocated REs in at least one time unit, and the transmitting power on other allocated REs in the at least one time unit is boosted to the part of the allocated REs. As an example, the maximum frequency domain density may be 3 REs per PRB, that is, other 9 REs in the PRB are blank REs. That is, the TX UE does not transmit anything on these REs. Thus, the TX UE may concentrate the transmitting power, which is originally allocated to the blank REs, on REs of the SL-CSI-RS, that is, power boosting is performed on the REs of the SL-CSI-RS. In this example, assuming that the existing power allocation method for the PSSCH is reused, when the transmitting power (i.e., the transmitting power to be allocated) remains unchanged at the given bandwidth, the energy per resource element (EPRE) of the SL-CSI-RS may be boosted to 4 times (i.e., 8 dB, increased by 6 dB) of the EPRE (assumed as 2 dB) of the PSSCH.

Figure 11:
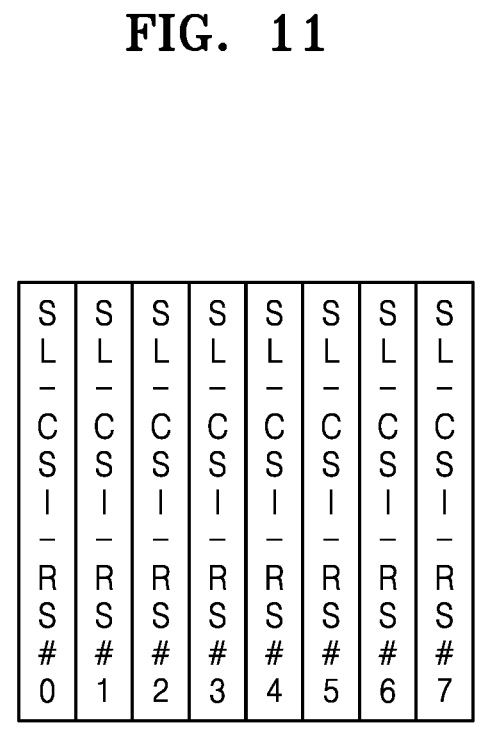

In some embodiments of the present disclosure, the PSSCH resources in a slot may be used to transmit a plurality of SL-CSI-RSs, that is, the standalone SL-CSI-RS transmission may include a plurality of SL-CSI-RS resources in a slot. The plurality of SL-CSI-RS resources occupy all remaining symbols other than necessary symbols in the slot. The necessary symbols include at least one of AGC, PSCCH, PSFCH, 2nd-stage SCI, GP, etc. As an example, as shown in FIG. 11, the standalone SL-CSI-RS transmission includes 8 SL-CSI-RS resources (i.e., resources {#0 to #7}) in a slot, and each SL-CSI-RS resource occupies one OFDM symbol.

Optionally, the standalone SL-CSI-RS transmission includes at least one SL-CSI-RS resource, and the index of the at least one SL-CSI-RS resource is determined in at least one of the following ways.

(1) The index of the first SL-CSI-RS source in the at least one SL-CSI-RS resource is indicated by an SCI, and the indexes of the remaining SL-CSI-RS resources are cyclically increased sequentially.

In this method, the index of the first SL-CSI-RS resource is indicated by the SCI, and the indexes of the remaining SL-CSI-RS resources are cyclically increased sequentially. That is, the index of the second SL-CSI-RS resource is the index of the first SL-CSI-RS resource plus 1, and the indexes of other SL-CSI-RS resources are deduced in a similar way. When the resource index exceeds the configured maximum resource index, the resource index starts to increase cyclically. For example, assuming that the maximum resource number of the SL-CSI-RS is 8 (that is, the maximum resource index is #7), the SCI schedules 4 SL-CSI-RSs. If the index of the first SL-CSI-RS resource is #6, the indexes of other SL-CSI-RS resources are successively #7, #0 and #1.

(2) The index of an SL-CSI-RS resource set where the at least one SL-CSI-RS resource is located is indicated by the SCI, and the index of each SL-CSI-RS resource included in the SL-CSI-RS resource set is configured by a PC5 radio resource control (RRC) signaling.

In this method, the index of the SL-CSI-RS resource set where the plurality of SL-CSI-RSs are located is indicated by the SCI. One SL-CSI-RS resource set includes a plurality of SL-CSI-RS resources, and the TX UE configures for each SL-CSI-RS resource the indexes of the plurality SL-CSI-RS resources by a PC5-RRC signaling. If the number of SL-CSI-RSs scheduled by the SCI is less than the number of SL-CSI-RS resources included in an SL-CSI-RS resource set, the indexes of the SL-CSI-RS resources scheduled by the SCI are defaulted as the indexes of first few SL-CSI-RS resources included in the corresponding SL-CSI-RS resource set. For example, assuming that the PC5-RRC signaling configures that the indexes of SL-CSI-RS resources included in an SL-CSI-RS resource set are {#0, #2, #4, #6}, if the SCI schedules 3 SL-CSI-RS resources, the indexes of the corresponding resources are defaulted as #0, #2 and #4.

(3) The index of each SL-CSI-RS resource in the at least one SL-CSI-RS resource is separately indicated by the SCI.

In this method, the indexes of the plurality of SL-CSI-RS resources are separately indicated by the SCI. For example, the SCI includes a plurality of fields for respectively indicating the indexes of the plurality of SL-CSI-RS resources.

In practical applications, the TX UE may transmit the plurality of SL-CSI-RS resources by using the same beam, that is, the plurality of SL-CSI-RS resources are associated with the same beam. This transmission mode is called beam repetition. The beam repetition may be used by the RX UE to determine the best receiving beam or refine the receiving beam. For example, the RX UE may perform measurement on different repetitive beams by using different receiving beams, and the receiving beam with the best measurement result is the best receiving beam; or, the TX UE may also transmit the plurality of SL-CSI-RS resources by using different beams, that is, the plurality of SL-CSI-RS resources may be associated with different beams. This transmission mode is called beam sweeping. The beam sweeping may be used by the RX UE to determine the best transmitting beam. For example, the RX UE performs measurement on different sweeping beams by using the same receiving beam. The transmitting beam with the best measurement result is the best transmitting beam, and the information of the best transmitting beam is reported to the TX UE. In some embodiments of the present disclosure, when the SL-CSI-RS includes at least one SL-CSI-RS resource, the TX UE may indicate, by the SCI, whether the at least one SL-CSI-RS resource is transmitted by using a same TX spatial filter. For example, 1 bit in the SCI indicates that the plurality of SL-CSI-RS resources are transmitted in a "repetition" or "sweeping" manner.

In some embodiments of the present disclosure, since the standalone SL-CSI-RS transmission may include a plurality of SL-CSI-RS resources in a slot, for the flexibility of resource allocation, the number of SL-CSI-RS resources included in a slot may be variable.

Optionally, the number of SL-CSI-RS resources included in the SL-CSI-RS is determined in at least one of the following ways.

(1) The number of SL-CSI-RS resources is indicated by the SCI. For example, the SCI may indicate the SL-CSI-RS in a slot is the same resource or different resources. When the SCI indicates that the SL-CSI-RS is the same resource, it indicates that all symbols that can be transmitted in a slot are used for the transmission of the same SL-CSI-RS resource, that is, the number of SL-CSI-RS resources is 1 (corresponding to FIG. 13, i.e., resource {#0}). When the SCI indicates that the SL-CSI-RS is different resources, assuming that one SL-CSI-RS resource occupies one symbol, it indicates that the number of symbols that can be transmitted in a slot is the number of the included SL-CSI-RS resources (corresponding to FIG. 11); or, it is indicated by the SCI that the number of SL-CSI-RS resources is at least one of 1, 2, 4 or the maximum transmission number in the slot.

(2) The number of SL-CSI-RS resources is determined based on the total number of time units occupied by the SL-CSI-RS and the number of time units occupied by one SL-CSI-RS resource. For example, the number of SL-CSI-RS resources is determined according to the total number of symbols occupied by the SL-CSI-RS and the number of symbols occupied by one SL-CSI-RS resource. The total number of symbols may be determined based on the resource pool, and the number of time units occupied by one SL-CSI-RS resource may be indicated by the SCI or determined based on the transmission bandwidth size. As shown in FIG. 12, the total number of symbols of the standalone SL-CSI-RS transmission is 8. When the number of symbols occupied by one SL-CSI-RS resource is indicated as 2 by the SCI, it can be determined that one slot includes 4 SL-CSI-RS resources (i.e., resources {#0 to #3}).

In some embodiments of the present disclosure, similar to the existing SL-CSI-RS transmission is not standalone, since the standalone SL-CSI-RS transmission may also be discretely mapped in the frequency domain, it is desirable to determine the starting RE position of the SL-CSI-RS in the frequency domain. For example, assuming that the frequency density is 3 REs per PRB, there are 4 candidate starting RE positions; and, assuming that the frequency density is 1 RE per PRB, there are 12 candidate starting RE positions.

Optionally, when the SL-CSI-RS includes at least one SL-CSI-RS resource, the starting RE position of the at least one SL-CSI-RS resource is determined in at least one of the following ways.

(1) The starting RE position of the first SL-CSI-RS resource in the at least one SL-CSI-RS resource is indicated by an SCI, and the starting RE positions of other SL-CSI-RS resources are cyclically shifted sequentially.

In this method, the starting RE position of an SL-CSI-RS resource is indicated by the SCI. If a plurality of SL-CSI-RS resources are included in a slot, the starting RE positions of the plurality of SL-CSI-RS resources are defaulted to be the same; or, the SCI indicates the starting RE position of the first SL-CSI-RS resource, and the starting RE positions of other SL-CSI-RS resources are sequentially shifted by a third preset number of REs. For example, assuming that 8 SL-CSI-RS resources are included in a slot, the frequency domain density of the SL-CSI-RS is 3 REs per PRB, and the SCI indicates that the starting RE position of the first SL-CSI-RS resource is the first candidate RE position. If the first candidate RE position is represented by #0, the second candidate RE position is represented by #1, the third candidate RE position is represented by #2 and the fourth candidate RE position is represented by #3, the starting RE positions of the remaining SL-CSI-RS resources are successively {#1, #2, #3, #0, #1, #2, #3}.

(2) The starting RE position of each SL-CSI-RS resource in the at least one SL-CSI-RS resource is separately indicated by the SCI.

(3) The starting RE position of the first SL-CSI-RS resource in the at least one SL-CSI-RS resource is determined based on at least one of a first UE identity (ID), a second UE ID, the index (e.g., slot index and/or symbol index) of the time unit where the SL-CSI-RS resource is located, the index of the SL-CSI-RS resource and a decimal value of cyclic redundancy check (CRC) of the SCI, and the starting RE positions of other SL-CSI-RS resources are cyclically shifted sequentially.

(4) The starting RE position of each SL-CSI-RS resource in the at least one SL-CSI-RS resource is determined based on at least one of the first UE ID, the second UE ID, the index of the time unit where the SL-CSI-RS resource is located, the index of the SL-CSI-RS resource and the decimal value of CRC of the SCI.

In the two methods, the starting RE position of an SL-CSI-RS resource is explicitly determined by a parameter. For example, a modular operation is performed on the number of candidate RE positions by mathematical operation values of one or more parameters, and the corresponding starting RE position is determined based on the result of the modular operation. The parameter for determining the starting RE position may be at least one of the following: a source ID (i.e., first UE ID), a destination ID (i.e., second UE ID), the index where the SL-CSI-RS is located, the index of the symbol where the SL-CSI-RS resource is located, the decimal value of CRC of the associated SCI, etc.

In some embodiments of the present disclosure, similar to other physical channels in the sidelink communication system, the standalone SL-CSI-RS transmission may have a priority. The priority may be indicated in the SCI associated with the SL-CSI-RS. In the resource allocation mode of Mode 2, the UE will use the priority of the SL-CSI-RS when autonomously allocating resources, and the priority of the SL-CSI-RS will also be used to solve the transmission collision of the TX UE, the reception collision of the RX UE, etc.

Optionally, the priority of the SL-CSI-RS is determined by at least one of the following.

(1) A predefined priority value.

In this method, a fixed priority value is predefined for the SL-CSI-RS.

(2) A priority value configured for each resource pool.

In this method, the priority value of the SL-CSI-RS is configured for each resource pool, that is, the SL-CSI-RSs of all UEs in the resource pool have the same priority. For example, if the UE is within a network coverage region, the priority value may be configured by the base station; and, if the UE is not within the network coverage region, the priority value may be determined by the configured sidelink parameter.

(3) The priority of data transmitted to the second UE by the first UE.

In this method, the TX UE may determine the priority of the SL-CSI-RS according to the priority of the data transmitted between the TX UE and the RX UE. For example, the priority of the SL-CSI-RS transmitted by the TX UE may reuse the priority of the data transmitted to the RX UE by the TX UE.

Based on at least one of the above embodiments, the SCI (1st-stage SCI and/or 2nd-stage SCI) associated with the standalone SL-CSI-RS transmission may indicate at least one of the following information related to the SL-CSI-RS:

(1) the index of the SL-CSI-RS resource set, where the SCI may indicate the index of the SL-CSI-RS resource set, and the SL-CSI-RS resource set may be configured to the RX UE by the TX UE by a PC5-RRC signaling;

(2) the index of an SL-CSI-RS resource, where the SCI may indicate the index of the SL-CSI-RS resource;

(3) the index of the first SL-CSI-RS resource among the plurality of SL-CSI-RS resources, where the SCI may indicate the index of the first SL-CSI-RS resource among the plurality of SL-CSI-RS resources and the indexes of other SL-CSI-RS resources are cyclically increased sequentially;

(4) a transmission configuration indicator (TCI) of the SL-CSI-RS resource, where the SCI may indicate the TCI of the SL-CSI-RS resource;

(5) the TCI of the first SL-CSI-RS resource among the plurality of SL-CSI-RS resources, where the SCI may indicate the TCI of the first SL-CSI-RS resource among the plurality of SL-CSI-RS resources and the TCIs of other SL-CSI-RS resources are cyclically increased sequentially;

(6) the beam ID of the SL-CSI-RS resource, where the SCI may indicate the beam ID of the SL-CSI-RS resource;

(7) the beam ID of the first SL-CSI-RS resource among the plurality of SL-CSI-RS resources, where the SCI may indicate the beam ID of the first SL-CSI-RS resource among the plurality of SL-CSI-RS resources and the beam IDs of other SL-CSI-RS resources are cyclically increased sequentially;

(8) the starting RE position of the SL-CSI-RS resource, where the SCI may indicate the starting RE position of the SL-CSI-RS resource;

(9) the starting RE position of the first SL-CSI-RS resource among the plurality of SL-CSI-RS resources, where the SCI may indicate the starting RE position of the first SL-CSI-RS resource among the plurality of SL-CSI-RS resources and the starting RE positions of other SL-CSI-RS resources are cyclically increased sequentially;

(10) whether the plurality of SL-CSI-RS resources are transmitted by using a same TX spatial filter, where the SCI may indicate that the beam direction corresponding to the plurality of SL-CSI-RS resources is "repetition" or "sweeping"; for example, when the indication value is "enable", it indicates that the beam direction corresponding to the plurality of SL-CSI-RS resources is "repetition"; and, when the indication value is "disable", it indicates that the beam direction corresponding to the plurality of SL-CSI-RS resources is not "repetition";

(11) the number of time units occupied by one SL-CSI-RS resource, where, for example, the SCI may indicate the number of symbols occupied by one SL-CSI-RS resource;

(12) the number of SL-CSI-RS resources included in the scheduled SL-CSI-RS, where the SCI may indicate the number of the included SL-CSI-RS resources;

(13) the frequency domain density of the SL-CSI-RS resources, where the SCI may indicate the frequency domain density of the SL-CSI-RS resources;

(14) whether the SL-CSI-RS resources are repeated on REs, where the SCI may indicate whether the SL-CSI-RS resources are repeated on REs;

(15) whether SL-CSI-RS resources are repeated on time units, where the SCI may indicate whether the SL-CSI-RS resources are repeated on time units (in the time domain);

(16) the number of repetitions of the SL-CSI-RS on time units, where the SCI may indicate the number of repetitions of the SL-CSI-RS in time domain;

(17) the triggering of measurement reporting based on the SL-CSI-RS, where the SCI may trigger measurement reporting based on the SL-CSI-RS, including triggering at least one of feedback based on the PSFCH and reporting based on the MAC CE hereinafter. For example, when the indication value is "enable", the RX UE should feed back a measurement result by a PSFCH; and, when the indication value is "disable", the RX UE does not need to feed back a measurement result by a PSFCH;

(18) the triggering of reporting of at least one of a plurality of measurement quantities based on the SL-CSI-RS, where the SCI may trigger reporting of one or more of a plurality of measurement quantities based on the SL-CSI-RS;

(19) the ID of at least one second UE that performs measurement reporting, where the SCI may indicate the IDs of one or more destination UEs that should perform measurement reporting; and

(20) the priority of the SL-CSI-RS, where the SCI may indicate the priority of the SL-CSI-RS.

In some embodiments of the present disclosure, in order not to increase the complexity of blind detection of PSCCHs by the UE, the 1st-stage SCI format for scheduling the SL-CSI-RS has the same total number of load bits as the 1st-stage SCI format for scheduling a PSSCH. In addition, the 1st-stage SCI format for scheduling the SL-CSI-RS and the 1st-stage SCI format for scheduling a PSSCH should be distinguished explicitly or implicitly.

Optionally, the 1st-stage SCI format for scheduling the SL-CSI-RS and the 1st-stage SCI format for scheduling a PSSCH are distinguished in at least one of the following ways.

(1) The 1st-stage SCI includes a 1-bit indication field for indicating that the 1st-stage SCI is used to schedule a PSSCH or the SL-CSI-RS. The 1st-stage SCI includes a 1-bit indication field for indicating that the SCI is which SCI format (i.e., correspondingly scheduling the PSSCH or the SL-CSI-RS).

(2) If at least one indication field in the 1st-stage SCI is a predetermined value, the 1st-stage SCI is used to schedule the SL-CSI-RS; otherwise, the 1st-stage SCI is used to schedule the PSSCH. For example, for the 1st-stage SCI for scheduling the SL-CSI-RS, some indication fields are set as a fixed value (for example, all indication fields are set as "0" or "1"). If the indication value of this or these fields received by the UE is the predefined value, it is considered that the SCI is used to schedule the SL-CSI-RS; otherwise, the SCI is used schedule to the PSSCH. This or these fields may be, but not limited to, at least one of the DMRS pattern indication field, the 2nd-stage SCI format indication field, the Beta_offset indication field, the DMRS port number indication field, the MCS indication field, the additional MCS table indication field or the like in the existing 1st-stage SCI.

In some embodiments of the present disclosure, similar to the communication system based on the UU interface, the measurement quantity for evaluating the quality of a beam may be the layer 1 reference signal received power (L1-RSRP), the layer 1 signal to interference plus noise ratio (L1-SINR) or the channel state information (CSI). In the sidelink system, for the purpose of distinguishing, the corresponding measurement quantities may be called SL-L1-RSRP, SL-L1-SINR and SL-CSI. That is, in some embodiments of the present disclosure, the measurement quantity reported by the RX UE hereinafter may be at least one of the SL-L1-RSRP, the SL-L1-SINR and the SL-CSI.

In some embodiments of the present disclosure, a feasible implementation is provided for the step S103. Specifically, the measurement result based on the SL-CSI-RS may be reported to the first UE by an MAC CE and/or a PSFCH. One or both of the two reporting modes may be implemented.

In an optional implementation, due to the resource allocation characteristics of sidelink resources, it is more reasonable to aperiodically report the measurement quantity. Since the current feedback channel PSFCH can carry 1-bit information and cannot carry multi-bit information, it is reasonable to report the measurement quantity by an MAC CE. Specifically, at least one of the following information may be reported by the MAC CE (that is, the measurement result reported by the MAC CE includes at least one of the following information):

(1) a measurement quantity of a specific SL-CSI-RS resource, where, for example, the measurement quantity (e.g., SL-L1-RSRP value) of the specific SL-CSI-RS resource is reported by the MAC CE, and the SL-L1-RSRP in a range of [−140,−44] is quantified as 7 bits;

(2) the largest value among the measurement quantities of a plurality of SL-CSI-RS resources and the index of its corresponding SL-CSI-RS resource, where the largest value among the measurement quantities of the plurality of SL-CSI-RS resources and the index of the its corresponding SL-CSI-RS resource are reported by the MAC CE;

(3) at least two largest values among the measurement quantities of a plurality of SL-CSI-RS resources and the indexes of their corresponding SL-CSI-RS resources, where M best values among the measurement quantities of a plurality of SL-CSI-RS resources and the indexes of the their corresponding SL-CSI-RS resources are reported by the MAC CE, where the value of M may be 1, 2, 3, or 4, etc., and the value of M may be indicated to the RX UE by the TX UE by a signaling;

(4) values greater than a first threshold among the measurement quantities of a plurality of SL-CSI-RS resources and indexes of their corresponding SL-CSI-RS resources, where the values greater than the first threshold among the measurement quantities of a plurality of SL-CSI-RS resources and the indexes of the their corresponding SL-CSI-RS resources are reported by the MAC CE; and (5) the largest value among the measurement quantities of a plurality of SL-CSI-RS resource sets, the index of its corresponding SL-CSI-RS resource set, and the index of the its corresponding SL-CSI-RS resource, where the largest value among the measurement quantities of a plurality of SL-CSI-RS resource sets, the index of the corresponding SL-CSI-RS resource set and the index of its corresponding SL-CSI-RS resource are reported by the MAC CE.

In another optional implementation, although the PSFCH cannot provide multi-bit information reporting and can roughly report the measurement quantity, and the PSFCH resource for reporting can be determined based on the transmission resource of the SL-CSI-RS. Optionally, the PSFCH resource for reporting is determined based on the index of the time unit where the SL-CSI-RS is located, the index of the starting sub-channel of the SL-CSI-RS and/or the number of sub-channels occupied by the SL-CSI-RS.

For example, the existing mapping relationship between PSSCH resources and PSFCH resources may be reused.

Specifically, a group of PSFCH resources may be determined in the corresponding PSFCH slot according to the index i of the slot where the standalone SL-CSI-RS transmission is located, the index j of the starting sub-channel and the number $$N_{subch}^{SLCSIRS}$$

of occupied sub-channels.

According to the configuration of the resource pool, it can be determined that $$N_{PSSCH}^{PSFCH}$$

PSSCH slots are associated with one PSFCH slot, and one PSFCH slot includes total of $$M_{PRB,set}^{PSFCH}$$

PRBs for PSFCH transmission, so that the PSFCH PRB corresponding to the $j^{th}$ sub-channel in the $i^{th}$ PSSCH slot is a PRB numbered as $$\left[\left(i + j \cdot N_{PSSCH}^{PSFCH}\right) \cdot M_{subch,slot}^{PSFCH},\ \left(i + 1 + j \cdot N_{PSSCH}^{PSFCH}\right) \cdot M_{subch,slot}^{PSFCH} - 1\right]$$

among $$M_{PRB,set}^{PSFCH}$$

PRBs, where $$0 \le i < N_{PSSCH}^{PSFCH},$$

and $0 \le j < N_{subch}$. The index of the PRB is determined by ascending i, followed by j.

$$M_{subch,slot}^{PSFCH}$$

is the number of PSFCH PRBs corresponding to a sub-channel in a PSSCH slot, $$M_{subch,slot}^{PSFCH} = M_{PRB,set}^{PSFCH} / (N_{subch} \cdot N_{PSSCH}^{PSFCH}),$$

and $N_{subch}$ is the maximum number of sub-channels included in a PSSCH slot.

In addition, each PSFCH PRB incudes $$N_{CS}^{PSFCH}$$

PFSCH code domain resources, and $$N_{CS}^{PSFCH}$$

is the number of cyclic shift pairs determined according to the resource pool configuration parameter sl-NumMuxCS-Pair. Thus, the UE may determine that the total number of available PSFCH resources is $$R_{PRB,CS}^{PSFCH} = N_{type}^{PSFCH} \cdot M_{subch,slot}^{PSFCH} \cdot N_{CS}^{PSFCH}.$$

If sl-PSFCH-CandidateResourceType is configured as start-SubCH, that is, if available PSFCH resources are determined according to the starting sub-channel, $$N_{type}^{PSFCH} = 1;$$

and, if sl-PSFCH-CandidateResourceType is configured as allocSubCH, that is, if available PSFCH resources are determined according to the number of sub-channels, $$N_{type}^{PSFCH} = N_{subch}^{PSSCH}.$$

Therefore, a group of PSFCH resources with a size of $$R_{PRB,CS}^{PSFCH}$$

may be determined according to the index of the slot where the SL-CSI-RS is located, the index of the starting sub-channel and the number of occupied sub-channels.

Further, if one slot includes only one SL-CSI-RS resource, the index of a PSFCH resource for reporting beam information or rough beam quality may be determined among $$R_{PRB,CS}^{PSFCH}$$

PSFCH resources by the following formula:

$$(P_{ID} + M_{ID}) \bmod R_{PRB,CS}^{PSFCH}$$

Alternatively, if one slot includes one or more SL-CSI-RS resources, the index of a PSFCH resource for reporting beam information or rough beam quality may be determined among $$P_{PRB,CS}^{PSFCH}$$

PSFCH resources by the following formula:

$$(P_{ID} + M_{ID} + N_{SLCSIRS}^{index}) \bmod R_{PRB,CS}^{PSFCH}$$

where $$0 \le N_{SLCSIRS}^{index} < N_{SLCSIRS},$$

$N_{SLCSIRS}$ is the maximum index of the SL-CSI-RS resource, $$N_{SLCSIRS}^{index}$$

is the index of the SL-CSI-RS resource corresponding to the beam information to be reported, $P_{ID}$ is the physical layer source ID (i.e., first UE ID) indicated in the SCI for scheduling the SL-CSI-RS, and $M_{ID}$ is the physical layer destination ID (i.e., second UE ID) indicated in the SCI, the UE ID indicated by a higher layer, or 0.

That is, the method in some embodiments of the present disclosure further includes: determining a group of PSFCH resources based on at least one of the index of the time unit where the SL-CSI-RS is located, the index of the starting sub-channel and the number of occupied sub-channels; and, determining a PSFCH resource for reporting in the group of PSFCH resources based on at least one of the first UE ID, the second UE ID and the index of the SL-CSI-RS resource corresponding to the measurement result to be reported.

In some embodiments of the present disclosure, the RX UE may roughly report the measurement quantity by feeding back first state information (e.g., ACK) or second state information (e.g., NACK) on the PSFCH resource corresponding to the SL-CSI-RS. Optionally, the reporting a measurement result based on the SL-CSI-RS to the first UE by a PSFCH includes at least one of the following ways.

(1) If the measurement quantity is greater than or equal to a second threshold, the first state information is fed back by a PSFCH; if the measurement quantity is less than the second threshold and greater than or equal to a third threshold, the second state information is fed back by a PSFCH; or, if the measurement quantity is less than the third threshold, no feedback is given. That is, if the measurement quantity is greater than or equal to the second threshold, the RX UE feeds back the first state information on the corresponding PSFCH resource; if the measurement quantity is less than the second threshold and greater than or equal to the third threshold, the RX UE feeds back the second state information on the corresponding PSFCH resource; or, if the measurement quantity is less than the third threshold, no feedback is given.

(2) If the measurement quantity is greater than or equal to a fourth threshold, the first state information is fed back by a PSFCH; or, if the measurement quantity is less than the fourth threshold, the second state information is fed back by a PSFCH. That is, if the measurement quantity is greater than or equal to the fourth threshold, the RX UE feeds back the first state information on the corresponding PSFCH resource; otherwise, the RX UE feeds back the second state information.

(3) If the measurement quantity is greater than or equal to a fifth threshold, the first state information is fed back by a PSFCH; or, if the measurement quantity is less than the fifth threshold, no feedback is given. That is, if the measurement quantity is greater than or equal to the fifth threshold, the RX UE feeds back the first state information; otherwise, no feedback is given.

In some embodiments of the present disclosure, when one slot includes a plurality of SL-CSI-RS resources and if there are a plurality of SL-CSI-RS resources satisfying the above feedback condition, the RX UE feeds back the first state information or the second state information on the PSFCH resource corresponding to the best measurement quantity. That is, the step of reporting the measurement result based on the SL-CSI-RS to the first UE by a PSFCH may include: the SL-CSI-RS including a plurality of SL-CSI-RS resources, and feeding back the first state information or second state information on the PSFCH resource corresponding to the largest value among the measurement quantities corresponding to the plurality of SL-CSI-RS resources.

In some embodiments of the present disclosure, measurement reporting means that the RX UE reports the measurement result based on the SL-CSI-RS to the TX UE, and RX UE performing measurement reporting should be triggered based on the signaling from the TX UE. That is, after the RX UE receives a trigger signaling transmitted by the TX UE, the RX UE reports the measurement result. The TX UE may trigger measurement reporting by an MAC CE or SCI, that is, the signaling for triggering measurement reporting is an SCI or an MAC CE. Optionally, after the TX UE triggers one measurement reporting to the RX UE, before the expected last slot before the completion of the ongoing measurement reporting, the TX UE cannot trigger measurement reporting to the same RX UE again.

In an example, the TX UE may trigger SL-L1-RSP reporting by an SCI or MAC CE. For example, the rough reporting based on the PSFCH is triggered by the SCI, and the accurate reporting based on the MAC CE is triggered by the MAC CE.

In an optional implementation, the TX UE may trigger measurement reporting by 1 bit in the SCI, or the TX UE may trigger the rough reporting based on the PSFCH and the accurate reporting based on the MAC CE by 2 bits in the SCI, respectively. That is, the two reporting modes may be triggered simultaneously. The advantage is that the TX UE may quickly receive the rough reporting based on the PSFCH to perform the rough adjustment of the transmitting beam, and performs the accurate adjustment of the transmitting beam after receiving the accurate reporting based on the MAC CE.

In some embodiments of the present disclosure, the signaling for triggering measurement reporting is an SCI, and the SL-CSI-RS used for performing measurement by the second UE is an SL-CSI-RS scheduled by the SCI. That is, the TX UE triggers measurement reporting by the SCI, and the SL-CSI-RS used for measurement by the RX UE is the SL-CSI-RS indicated by the SCI.

In another optional implementation, the TX UE triggers measurement reporting by an MAC CE. Since the MAC CE carries more bits, the TX UE may indicate to report based on a certain SL-CSI-RS resource or SL-CSI-RS resource set by the MAC CE; or, the TX UE may also indicate the value of M by the MAC CE, where M is the number of the best measurement values reported by the RX UE; or, the TX UE may also indicate to report at least one of a plurality of measurement quantities (SL-L1-RSRP, SL-L1-SINR, SL-CSI, etc.) by the MAC CE.

Moreover, in some embodiments of the present disclosure, if the TX UE triggers measurement reporting by an MAC CE, that is, if the signaling for triggering measurement reporting is an MAC CE, the SL-CSI-RS for performing measurement by the second UE is at least one of the following: an SL-CSI-RS transmitted most recently before the MAC CE; an SL-CSI-RS transmitted in a first preset time window before the MAC CE; an SL-CSI-RS transmitted most recently after the MAC CE; and, an SL-CSI-RS transmitted in a second preset time window after the MAC CE.

In the measurement reporting mode based on the MAC CE, the maximum latency for the RX UE to perform measurement reporting should be limited, that is, the moment when the RX UE performs measurement reporting should be within a specified latency boundary. After the latency boundary, the RX UE does not perform reporting, that is, the RX UE may discard the measurement result. That is, the method in some embodiments of the present disclosure further includes: within a latency boundary after receiving the signaling for triggering measurement reporting transmitted by the first UE, reporting the measurement result based on the SL-CSI-RS to the first UE, the value of the latency boundary being configured by a PC5 RRC signaling by the first UE.

Assuming that the latency boundary parameter for measurement reporting is called sl-LatencyBoundLIRSRP-Report, the RX UE should report the SL-CSI-RS within a duration sl-LatencyBoundLIRSRP-Report after receiving the triggering signaling from the TX UE. Optionally, the MAC layer may control the measurement reporting to be within the latency boundary by a timer sl-LIRSRP-ReportTimer. In addition, if the sidelink grant for transmitting the pending measurement report cannot satisfy the corresponding latency requirement, the MAC entity configured to use the sidelink resource allocation mode 1 can trigger a scheduling a request, i.e., requesting a resource from the base station to transmit a measurement report, so as to complete measurement reporting within the delay requirement. That is, the method in some embodiments of the present disclosure further includes: if the second UE is configured to use the resource allocation mode 1, upon receiving the signaling for triggering measurement reporting transmitted by the first UE, triggering a scheduling request. The specific control process will be described below.

1> If measurement reporting has been triggered by an SCI and has not been cancelled, or if measurement reporting has been triggered by an MAC CE and has not been cancelled:

1.1> if the sl-LIRSRP-ReportTimer corresponding to the triggered SL L1-RSPR reporting is not running:

1.1.1> the sl-LIRSRP-ReportTimer is started.

1.2> If the sl-LIRSRP-ReportTimer corresponding to the triggered measurement reporting is expired:

1.2.1> the triggered measurement reporting is cancelled.

1.3> If the MAC entity is allocated with sidelink resources for new transmission and the sidelink shared channel (SL-SCH) resource can contain an MAC CE for measurement reporting and its subheader according to the logical channel priority:

1.3.1> the MAC CE for measurement reporting is generated and the reusing and assembling process is performed;

1.3.2> the sl-LIRSRP-ReportTimer corresponding to the triggered measurement reporting is stopped;

1.3.3> the triggered measurement reporting is cancelled.

1.4> If the MAC entity is configured to use the sidelink resource allocation mode 1:

1.4.1> a scheduling request is triggered.

It is to be noted that all the above thresholds may be configured to the RX UE by a PC5 RRC signaling by the TX UE, or configured based on each resource pool.

Figure 14:
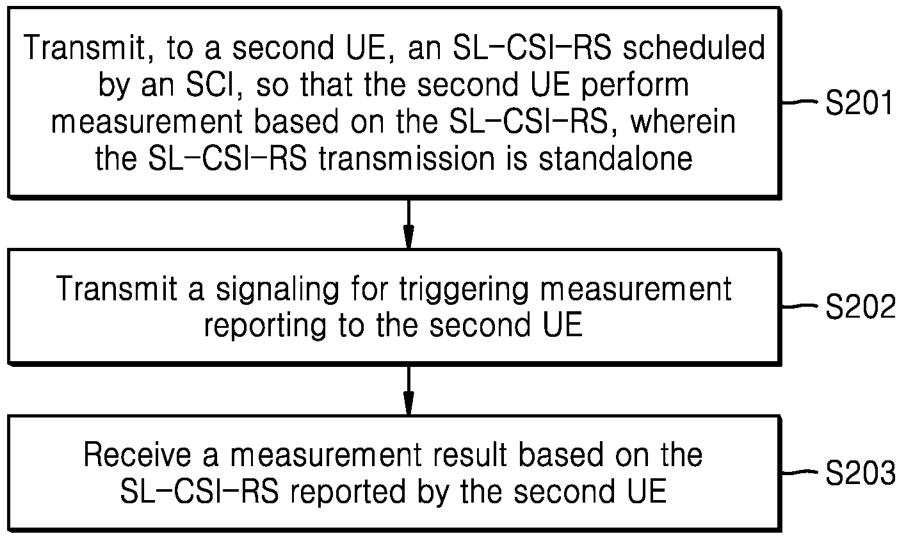
FIG. 14 illustrates a flowchart of a method executed by a first UE according to an embodiment of the present disclosure.

An embodiment of the present disclosure further provides a method executed by a first UE in a communication system. As shown in FIG. 14, the method includes the following steps.

In step S201, an SL-CSI-RS scheduled by an SCI is transmitted to a second UE, so that the second UE performs measurement based on the SL-CSI-RS.

In step S202, a signaling for triggering measurement reporting is transmitted to the second UE.

In step S203, a measurement result based on the SL-CSI-RS reported by the second UE is received.

The SL-CSI-RS transmission is standalone.

Optionally, the SL-CSI-RS and 1st-stage SCI are time-multiplexed, and/or the SL-CSI-RS and 2nd-stage SCI are time-multiplexed.

Optionally, the 2nd-stage SCI completely occupies first N time units of time domain resources of the SL-CSI-RS, where Nis an integer greater than or equal to 1.

Optionally, the number of time units completely occupied by the 2nd-stage SCI is determined in at least one of the following ways:

the number of time units occupied by the 2nd-stage SCI is indicated by the 1st-stage SCI; and the number of time units occupied by the 2nd-stage SCI is determined based on the number of sub-channels occupied by the SL-CSI-RS.

Optionally, determining the number of time units occupied by the 2nd-stage SCI based on the number of sub-channels occupied by the SL-CSI-RS includes at least one of the following ways:

the number of time units occupied by the 2nd-stage SCI is 2 if the number of sub-channels occupied by the SL-CSI-RS is less than or equal to a sixth threshold, or the number of time units occupied by the 2nd-stage SCI is 1 if the number of sub-channels occupied by the SL-CSI-RS is greater than the sixth threshold; and the number of time units occupied by the 2nd-stage SCI is 3 if the number of sub-channels occupied by the SL-CSI-RS is less than or equal to a seventh threshold, the number of time units occupied by the 2nd-stage SCI is 2 if the number of sub-channels occupied by the SL-CSI-RS is greater than the seventh threshold and less than or equal to an eighth threshold, or the number of time units occupied by the 2nd-stage SCI is 1 if the number of sub-channels occupied by the SL-CSI-RS is greater than the eighth threshold.

Optionally, the SL-CSI-RS includes at least one SL-CSI-RS resource, wherein one SL-CSI-RS resource is mapped to at least two consecutive time units.

Optionally, one SL-CSI-RS resource is mapped to at least two consecutive time units in at least one of the following ways:

the one SL-CSI-RS resource is mapped to the at least two consecutive time units by repeating on time units;

the one SL-CSI-RS resource is mapped to the at least two consecutive time units by cyclic shifting; and the one SL-CSI-RS resource is mapped to the at least two consecutive time units by generating a longer SL-CSI-RS signal sequence.

Optionally, the number of time units occupied by one SL-CSI-RS resource is determined in at least one of the following ways:

the number of time units occupied by one SL-CSI-RS resource is indicated by the SCI;

the number of time units occupied by one SL-CSI-RS resource is determined based on the number of sub-channels occupied by the SL-CSI-RS; and the number of time units occupied by one SL-CSI-RS resource is determined by the total number of time units occupied by the SL-CSI-RS and the number of SL-CSI-RS resources included in the SL-CSI-RS.

Optionally, determining the number of time units occupied by one SL-CSI-RS resource based on the number of sub-channels occupied by the SL-CSI-RS includes at least one of the following ways:

the number of time units occupied by one SL-CSI-RS resource is 2 if the number of sub-channels occupied by the SL-CSI-RS is less than or equal to a ninth threshold, or the number of time units occupied by one SL-CSI-RS resource is 1 if the number of sub-channels occupied by the SL-CSI-RS is greater than the ninth threshold; and the number of time units occupied by one SL-CSI-RS resource is 3 if the number of sub-channels occupied by the SL-CSI-RS is less than or equal to a tenth threshold, the number of time units occupied by one SL-CSI-RS resource is 2 if the number of sub-channels occupied by the SL-CSI-RS is greater than the tenth threshold and less than or equal to an eleventh threshold, or the number of time units occupied by one SL-CSI-RS resource is 1 if the number of sub-channels occupied by the SL-CSI-RS is greater than the eleventh threshold.

Optionally, the SL-CSI-RS is mapped to all of allocated resource elements (REs) in at least one time unit;

Alternatively, the SL-CSI-RS is mapped to part of the allocated REs in the at least one time unit, and the transmitting power on other allocated REs in the at least one time unit is boosted to the part of the allocated REs.

Optionally, the SL-CSI-RS is mapped to all of the allocated REs in the at least one time unit in at least one of the following ways:

the SL-CSI-RS is mapped to all of the allocated REs in the at least one time unit by repeating on REs; and the SL-CSI-RS is mapped to all of the allocated REs in the at least one time unit by generating a longer SL-CSI-RS signal sequence.

Optionally, the SL-CSI-RS includes at least one SL-CSI-RS resource, and the index of the at least one SL-CSI-RS resource is determined in at least one of the following ways:

the index of the first SL-CSI-RS source in the at least one SL-CSI-RS resource is indicated by an SCI, and the indexes of the remaining SL-CSI-RS resources are cyclically increased sequentially;

the index of the SL-CSI-RS resource set where the at least one SL-CSI-RS resource is located is indicated by the SCI, and the index of each SL-CSI-RS resource included in the SL-CSI-RS resource set is configured by a PC5 RRC signaling; and the index of each SL-CSI-RS resource in the at least one SL-CSI-RS resource is separately indicated by the SCI.

Optionally, the SL-CSI-RS includes at least one SL-CSI-RS resource, and the method further includes:

receiving, from the first UE, an indication by the SCI whether the at least one SL-CSI-RS resource is transmitted by using a same TX spatial filter.

Optionally, the number of SL-CSI-RS resources included in the SL-CSI-RS is determined in at least one of the following ways:

the number of SL-CSI-RS resources is indicated by the SCI; and the number of SL-CSI-RS resources is determined based on the total number of time units occupied by the SL-CSI-RS and the number of time units occupied by one SL-CSI-RS resource.

Optionally, the SL-CSI-RS includes at least one SL-CSI-RS resource, and the starting RE position of the at least one SL-CSI-RS resource is determined in at least one of the following ways:

the starting RE position of the first SL-CSI-RS resource in the at least one SL-CSI-RS resource is indicated by an SCI, and the starting RE positions of other SL-CSI-RS resources are cyclically shifted sequentially;

the starting RE position of each SL-CSI-RS resource in the at least one SL-CSI-RS resource is separately indicated by the SCI;

the starting RE position of the first SL-CSI-RS resource in the at least one SL-CSI-RS resource is determined based on at least one of a first UE identity (ID), a second UE ID, an index of a time unit where the SL-CSI-RS resource is located, the index of the SL-CSI-RS resource and a decimal value of CRC of the SCI, and the starting RE positions of other SL-CSI-RS resources are cyclically shifted sequentially; and the starting RE position of each SL-CSI-RS resource in the at least one SL-CSI-RS resource is determined based on at least one of the first UE ID, the second UE ID, the index of the time unit where the SL-CSI-RS resource is located, the index of the SL-CSI-RS resource and the decimal value of CRC of the SCI.

Optionally, the priority of the SL-CSI-RS is determined by at least one of the following:

a predefined priority value;

a priority value configured for each resource pool; and the priority of data transmitted to the second UE by the first UE.

Optionally, the 1st-stage SCI or 2nd-stage SCI associated with the SL-CSI-RS indicates at least one of the following information related to the SL-CSI-RS:

the index of an SL-CSI-RS resource set;

the index of an SL-CSI-RS resource;

the index of the first SL-CSI-RS resource among a plurality of SL-CSI-RS resources;

a transmission configuration indicator (TCI) of an SL-CSI-RS resource;

the TCI of the first SL-CSI-RS resource among the plurality of SL-CSI-RS resources;

the beam ID of the SL-CSI-RS resource;

the beam ID of the first SL-CSI-RS resource among the plurality of SL-CSI-RS resources;

the starting RE position of the SL-CSI-RS resource;

the starting RE position of the first SL-CSI-RS resource among the plurality of SL-CSI-RS resources;

whether the plurality of SL-CSI-RS resources are transmitted by using a same TX spatial filter;

the number of time units occupied by one SL-CSI-RS resource;

the number of SL-CSI-RS resources included in the scheduled SL-CSI-RS;

the frequency domain density of the SL-CSI-RS resources;

whether the SL-CSI-RS resources are repeated on REs;

whether the SL-CSI-RS resources are repeated on time units;

the number of repetitions of the SL-CSI-RS on time units;

the triggering of measurement reporting based on the SL-CSI-RS;

the triggering of reporting of at least one of a plurality of measurement quantities based on the SL-CSI-RS;

the ID of at least one second UE that performs measurement reporting; and the priority of the SL-CSI-RS.

Optionally, the 1st-stage SCI format for scheduling the SL-CSI-RS has the same total number of load bits as the 1st-stage SCI format for scheduling a PSSCH.

Optionally, the 1st-stage SCI format for scheduling the SL-CSI-RS and the 1st-stage SCI format for scheduling a PSSCH are distinguished in at least one of the following ways:

the 1st-stage SCI contains a 1-bit indication field for indicating that the 1st-stage SCI is used to schedule the PSSCH or the SL-CSI-RS; and if at least one indication field in the 1st-stage SCI is a predetermined value, the 1st-stage SCI is used to schedule the SL-CSI-RS; otherwise, the 1st-stage SCI is used to schedule the PSSCH.

Optionally, the receiving a measurement result based on the SL-CSI-RS reported by the second UE includes:

receiving a measurement result based on the SL-CSI-RS reported by an MAC CE and/or PSFCH by the second UE.

Optionally, the measurement result reported by the MAC CE includes at least one of the following information:

a measurement quantity of a specific SL-CSI-RS resource;

the largest value among the measurement quantities of a plurality of SL-CSI-RS resources, and the index of its corresponding SL-CSI-RS resource;

at least two largest values among the measurement quantities of the plurality of SL-CSI-RS resources, and the indexes of their corresponding SL-CSI-RS resources;

values greater than a first threshold among the measurement quantities of the plurality of SL-CSI-RS resources, and the indexes of their corresponding SL-CSI-RS resources; and the largest value among the measurement quantities of a plurality of SL-CSI-RS resource sets, the index of its corresponding SL-CSI-RS resource set, and the index of the its corresponding SL-CSI-RS resource.

Optionally, the reporting, by the second UE, a measurement result based on the SL-CSI-RS to the first UE by a PSFCH includes at least one of the following ways:

feeding back first state information by the PSFCH if the measurement quantity is greater than or equal to a second threshold, feeding back second state information by the PSFCH if the measurement quantity is less than the second threshold and greater than or equal to a third threshold, or giving no feedback if the measurement quantity is less than the third threshold;

feeding back first state information by the PSFCH if the measurement quantity is greater than or equal to a fourth threshold, or feeding back second state information by the PSFCH if the measurement quantity is less than the fourth threshold; and feeding back first state information by the PSFCH if the measurement quantity is greater than or equal to a fifth threshold, or giving no feedback if the measurement quantity is less than the fifth threshold.

Optionally, at least one of the first threshold, the second threshold, the third threshold, the fourth threshold, the fifth threshold, the sixth threshold, the seventh threshold, the eighth threshold, the ninth threshold, the tenth threshold and the eleventh threshold is determined in at least one of the following ways:

a predefined value; and being configured by a PC5 RRC signaling by the first UE.

Optionally, the measurement quantity includes at least one of the following:

layer 1 reference signal received power;

layer 1 signal to interference plus noise ratio; and channel state information.

Optionally, the PSFCH resource for reporting is determined based on at least one of the index of the time unit where the SL-CSI-RS is located, the index of the starting sub-channel of the SL-CSI-RS and the number of sub-channels occupied by the SL-CSI-RS.

Optionally, the PSFCH resource for reporting is determined in the following way:

determining a group of PSFCH resources based on at least one of the index of the time unit where the SL-CSI-RS is located, the index of the starting sub-channel of the SL-CSI-RS and the number of sub-channels occupied by the SL-CSI-RS; and determining a PSFCH resource for reporting in the group of PSFCH resources based on at least one of the first UE ID, the second UE ID and the index of the SL-CSI-RS resource corresponding to the measurement result to be reported.

Optionally, the reporting, by the second UE, a measurement result based on the SL-CSI-RS to the first UE by a PSFCH includes:

the SL-CSI-RS including a plurality of SL-CSI-RS resources, and feeding back first state information or second state information on a PFSCH resource corresponding to the largest value among measurement quantities of the plurality of SL-CSI-RS resources.

Optionally, the signaling for triggering measurement reporting is an SCI or an MAC CE.

Optionally, the signaling for triggering measurement reporting is an SCI, and the SL-CSI-RS for performing measurement by the second UE is an SL-CSI-RS scheduled by the SCI.

Optionally, the signaling for triggering measurement reporting is an MAC CE, and the SL-CSI-RS for performing measurement by the second UE is at least one of the following:

an SL-CSI-RS transmitted most recently before the MAC CE;

an SL-CSI-RS transmitted in a first preset time window before the MAC CE;

an SL-CSI-RS transmitted most recently after the MAC CE; and an SL-CSI-RS transmitted in a second preset time window after the MAC CE.

The method executed by a first UE provided in some embodiments of the present disclosure corresponds to the method in some embodiments on the second UE side, and the detailed functional descriptions and the achieved beneficial effects can specifically refer to the above description of the corresponding method in some embodiments on the second UE side and will not be repeated here.

An embodiment of the present disclosure provides an electronic device, including: a transceiver, which is configured to transmit and receive signals; and, a processor, which is coupled to the transceiver and configured to implement the steps in the above method embodiments. Optionally, the electronic device may be a first UE or a second UE, and the processor is configured to implement the steps in some embodiments of the method executed by the first UE or the second UE. The detailed functional descriptions and the achieved beneficial effects can refer to the above description of some embodiments of the method executed by the first UE or the second UE and will not be repeated here. In practical applications, the first UE or the second UE can be interpreted as different network nodes.

An embodiment of the present disclosure further provides an electronic device, including: a processor; and optionally, a transceiver and/or a memory coupled to the processor. The processor is configured to perform the steps of the method provided in any one of optional embodiments of the present disclosure.

Figure 15:
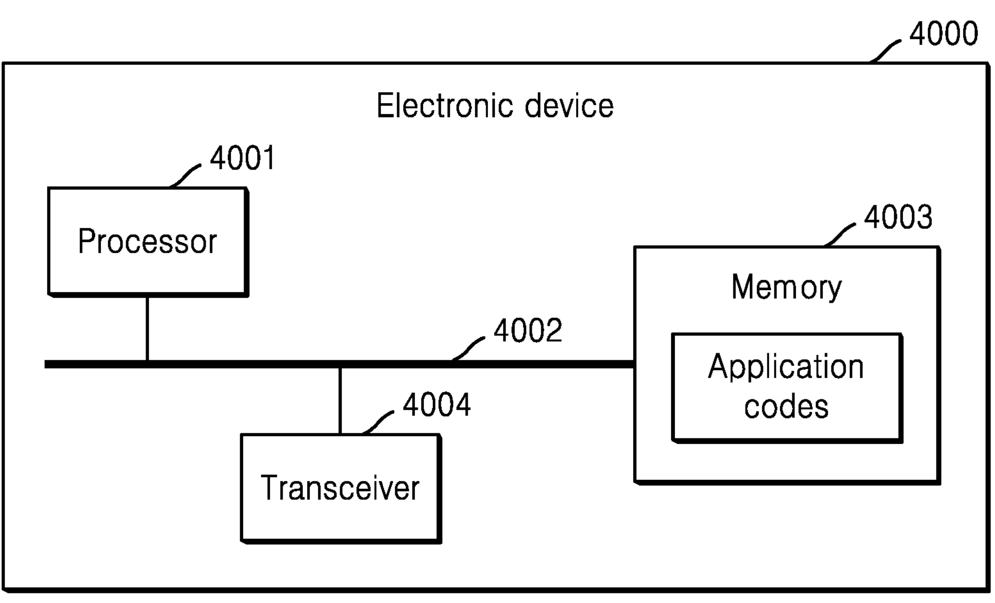
FIG. 15 illustrates a schematic structure diagram of an electronic device according to an embodiment of the present disclosure.

FIG. 15 illustrates a schematic structure diagram of an electronic device to which some embodiments of the present disclosure is applied. As shown in FIG. 15, the electronic device 4000 shown in FIG. 15 may include a processor 4001 and a memory 4003. The processor 4001 is connected to the memory 4003, for example, by a bus 4002. Optionally, the electronic device 4000 may further include a transceiver 4004. The transceiver 4004 may be used for data interaction between the electronic device and other electronic devices, such as data transmitting and/or data receiving. It should be noted that, in practical applications, the transceiver 4004 is not limited to one, and the structure of the electronic device 4000 does not constitute any limitations to embodiments of the present disclosure. Optionally, the electronic device can be a first network node, a second network node, or a third network node. In addition, the electronic device 4000 may correspond to a user equipment (UE) in 3GPP, for example UE 111-116 in FIG. 1, or the electronic device 4000 may correspond to base station in 3GPP, for example BS 101 in FIG. 1. The aforementioned components will now be described in detail.

The processor 4001 may be a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. It may implement or execute various exemplary logical blocks, modules and circuits described in connection with the present disclosure. The processor 4001 may also be a combination for realizing computing functions, for example, a combination of one or more microprocessors, a combination of a DSP and a microprocessor, etc.

The bus 4002 may include a path to transfer information between the components described above. The bus 4002 may be a peripheral component interconnect (PCI) bus, or an extended industry standard architecture (EISA) bus, etc. The bus 4002 may be an address bus, a data bus, a control bus, etc. For ease of presentation, the bus is represented by only one thick line in FIG. 15. However, it does not mean that there is only one bus or one type of buses.

The memory 4003 may be read only memories (ROMs) or other types of static storage devices that can store static information and instructions, random access memories (RAMs) or other types of dynamic storage devices that can store information and instructions, may also be electrically erasable programmable read only memories (EEPROMs), compact disc read only memories (CD-ROMs) or other optical disk storages, optical disc storages (including compact discs, laser discs, discs, digital versatile discs, blue-ray discs, etc.), magnetic storage media or other magnetic storage devices, or any other media that can be used to carry or store computer programs and can be read by a computer, without limitation here.

The memory 4003 is used to store a computer program for executing embodiments of the present disclosure, and is controlled by the processor 4001. The processor 4001 is used to execute the computer program stored in the memory 4003 to implement the steps shown in any method embodiment described above.

The transceiver 4004 may include a RF transmitter for up-converting and amplifying a transmitted signal, and a RF receiver for down-converting a frequency of a received signal. However, according to another embodiment, the transceiver 4004 may be implemented by more or less components than those illustrated in components.

The transceiver 4004 may be connected to the processor 4001 and transmit and/or receive a signal. The signal may include control information and data. In addition, the transceiver 4004 may receive the signal through a wireless channel and output the signal to the processor 4001. The transceiver 4004 may transmit a signal output from the processor 4001 through the wireless channel.

Embodiments of the present disclosure provide a computer-readable storage medium having a computer program stored on the computer-readable storage medium, the computer program, when executed by a processor, implements the steps and corresponding contents of the foregoing method embodiments.

Embodiments of the present disclosure also provide a computer program product including a computer program, the computer program, when executed by a processor, may implements the steps and corresponding contents of the foregoing method embodiments.

The terms "first", "second", "third", "fourth", "1", "2", etc. (if present) in the specification and claims of the disclosure and the accompanying drawings above are used to distinguish similar objects and need not be used to describe a particular order or sequence. It should be understood that the data so used is interchangeable where appropriate so that embodiments of the present disclosure described herein can be implemented in an order other than that illustrated or described in the text.

It should be understood that while the flow diagrams of embodiments of the present disclosure indicate the individual operational steps by arrows, the order in which these steps are performed is not limited to the order indicated by the arrows. Unless explicitly stated herein, in some implementation scenarios of embodiments of the present disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and embodiments of the present disclosure are not limited thereto.

The above text and accompanying drawings are provided as examples only to help readers understand the present disclosure. They are not intended and should not be construed as limiting the scope of the present disclosure in any way. Although certain embodiments and examples have been provided, based on what has been disclosed herein, it is obvious to those skilled in the art that the embodiments and examples shown may be altered without departing from the scope of the present disclosure, and it would have been within the scope of protection of embodiments of the present disclosure for those skilled in the art to adopt other similar implementation means based on the technical idea of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method executed by a second user equipment (UE) in a communication system, comprising:

receiving, from a first UE, a sidelink channel state information reference signal (SL-CSI-RS) scheduled by sidelink control information (SCI);

performing a measurement based on the SL-CSI-RS; and upon receiving a signaling for triggering measurement reporting transmitted by the first UE, reporting, to the first UE, a measurement result based on the SL-CSI-RS, wherein the SL-CSI-RS is a standalone transmission.

2. The method according to claim 1, wherein the SL-CSI-RS and 1st-stage SCI are time-multiplexed, or the SL-CSI-RS and 2nd-stage SCI are time-multiplexed.

3. The method according to claim 1, wherein the SL-CSI-RS comprises at least one SL-CSI-RS resource, wherein one SL-CSI-RS resource is mapped to at least two consecutive time units.

4. The method according to claim 3, wherein the one SL-CSI-RS resource is mapped to the at least two consecutive time units in at least one of the following ways:

the one SL-CSI-RS resource is mapped to the at least two consecutive time units by repeating the one SL-CSI-RS resource on the at least two consecutive time units;

the one SL-CSI-RS resource is mapped to the at least two consecutive time units by cyclic shifting; and the one SL-CSI-RS resource is mapped to the at least two consecutive time units by generating a longer SL-CSI-RS signal sequence.

5. The method according to claim 1, wherein the SL-CSI-RS is mapped to all of allocated resource elements (REs) in at least one time unit; or, the SL-CSI-RS is mapped to part of the allocated REs in the at least one time unit, and a transmitting power on other allocated REs in the at least one time unit is boosted to the part of the allocated REs.

6. The method according to claim 5, wherein the SL-CSI-RS is mapped to all of the allocated REs in the at least one time unit in at least one of the following ways:

the SL-CSI-RS is mapped to all of the allocated REs in the at least one time unit by repeating the SL-CSI-RS on all of the allocated REs; and the SL-CSI-RS is mapped to all of the allocated REs in the at least one time unit by generating a longer SL-CSI-RS signal sequence.

7. The method according to claim 1, wherein the SL-CSI-RS comprises at least one SL-CSI-RS resource, and an index of the at least one SL-CSI-RS resource is determined in at least one of the following ways:

an index of a first SL-CSI-RS resource in the at least one SL-CSI-RS resource is indicated by the SCI, and indexes of remaining SL-CSI-RS resources are cyclically increased sequentially;

an index of an SL-CSI-RS resource set where the at least one SL-CSI-RS resource is located is indicated by the SCI, and an index of each SL-CSI-RS resource included in the SL-CSI-RS resource set is configured by a PC5 radio resource control (RRC) signaling; and the index of each SL-CSI-RS resource in the at least one SL-CSI-RS resource is separately indicated by the SCI.

8. The method according to claim 1, wherein the SL-CSI-RS comprises at least one SL-CSI-RS resource, and a starting RE position of the at least one SL-CSI-RS resource is determined in at least one of the following ways:

a starting RE position of a first SL-CSI-RS resource in the at least one SL-CSI-RS resource is indicated by the SCI, and starting RE positions of other SL-CSI-RS resources are cyclically shifted sequentially;

the starting RE position of each SL-CSI-RS resource in the at least one SL-CSI-RS resource is separately indicated by the SCI;

the starting RE position of the first SL-CSI-RS resource in the at least one SL-CSI-RS resource is determined based on at least one of a first UE identity (ID), a second UE ID, an index of a time unit where the SL-CSI-RS resource is located, the index of the SL-CSI-RS resource and a decimal value of cyclic redundancy check (CRC) of the SCI, and the starting RE positions of other SL-CSI-RS resources are cyclically shifted sequentially; and the starting RE position of each SL-CSI-RS resource in the at least one SL-CSI-RS resource is determined based on at least one of the first UE ID, the second UE ID, the index of the time unit where the SL-CSI-RS resource is located, the index of the SL-CSI-RS resource and the decimal value of CRC of the SCI.

9. The method according to claim 1, wherein a priority of the SL-CSI-RS is determined by at least one of the following:

a predefined priority value;

a priority value configured for each resource pool; and a priority of data transmitted to the second UE by the first UE.

10. The method according to claim 1, wherein a 1st-stage SCI or a 2nd-stage SCI associated with the SL-CSI-RS indicates at least one of the following information related to the SL-CSI-RS:

an index of a SL-CSI-RS resource set;

an index of an SL-CSI-RS resource;

an index of a first SL-CSI-RS resource among a plurality of SL-CSI-RS resources;

a transmission configuration indicator (TCI) of the SL-CSI-RS resource;

a TCI of the first SL-CSI-RS resource among a plurality of SL-CSI-RS resources;

a beam ID of the SL-CSI-RS resource;

a beam ID of the first SL-CSI-RS resource among the plurality of SL-CSI-RS resources;

a starting RE position of the SL-CSI-RS resource;

a starting RE position of the first SL-CSI-RS resource among the plurality of SL-CSI-RS resources;

whether the plurality of SL-CSI-RS resources are transmitted by using a same transmitter (TX) spatial filter;

a number of time units occupied by one SL-CSI-RS resource;

a number of SL-CSI-RS resources included in the scheduled SL-CSI-RS;

a frequency domain density of the SL-CSI-RS resources;

whether the SL-CSI-RS resources are repeated on REs;

whether the SL-CSI-RS resources are repeated on time units;

a number of repetitions of the SL-CSI-RS on time units;

a triggering of measurement reporting based on the SL-CSI-RS;

a triggering of reporting of at least one of a plurality of measurement quantities based on the SL-CSI-RS;

an ID of at least one second UE that performs measurement reporting; and a priority of the SL-CSI-RS.

11. The method according to claim 1, wherein the reporting a measurement result based on the SL-CSI-RS to the first UE comprises:

reporting the measurement result based on the SL-CSI-RS to the first UE by a medium access control control element (MAC CE) or a physical sidelink feedback channel (PSFCH).

12. The method according to claim 11, wherein the measurement result reported by the MAC CE comprises at least one of the following information:

a measurement quantity of a specific SL-CSI-RS resource;

a largest value among measurement quantities of a plurality of SL-CSI-RS resources, and an index of the largest value among the measurement quantities of the plurality of SL-CSI-RS resources' corresponding SL-CSI-RS resource;

at least two largest values among the measurement quantities of the plurality of SL-CSI-RS resources, and indexes of the two largest value's corresponding SL-CSI-RS resources;

values greater than a first threshold among the measurement quantities of the plurality of SL-CSI-RS resources, and indexes of the values greater than the first threshold's corresponding SL-CSI-RS resources; and a largest value among measurement quantities of a plurality of SL-CSI-RS resource sets, an index of a corresponding SL-CSI-RS resource set, and an index of the largest value among the measurement quantities of the plurality of SL-CSI-RS resource sets' corresponding SL-CSI-RS resource.

13. The method according to claim 11, wherein the reporting a measurement result based on the SL-CSI-RS to the first UE by a PSFCH comprises at least one of the following:

feeding back first state information by the PSFCH if a measurement quantity is greater than or equal to a second threshold, feeding back second state information by the PSFCH if the measurement quantity is less than the second threshold and greater than or equal to a third threshold, or giving no feedback if the measurement quantity is less than the third threshold;

feeding back first state information by the PSFCH if the measurement quantity is greater than or equal to a fourth threshold, or feeding back second state information by the PSFCH if the measurement quantity is less than the fourth threshold; and feeding back first state information by the PSFCH if the measurement quantity is greater than or equal to a fifth threshold, or giving no feedback if the measurement quantity is less than the fifth threshold.

14. The method according to claim 11, wherein the PSFCH for reporting is determined based on at least one of an index of a time unit where the SL-CSI-RS is located, an index of a starting sub-channel of the SL-CSI-RS and a number of sub-channels occupied by the SL-CSI-RS.

15. The method according to claim 14, further comprising:

determining a group of PSFCH resources based on at least one of the index of the time unit where the SL-CSI-RS is located, the index of the starting sub-channel of the SL-CSI-RS and the number of sub-channels occupied by the SL-CSI-RS; and determining a PSFCH resource for reporting in the group of PSFCH resources based on at least one of a first UE ID, a second UE ID and an index of an SL-CSI-RS resource corresponding to the measurement result to be reported.

16. The method according to claim 13, wherein the reporting a measurement result based on the SL-CSI-RS to the first UE by a PSFCH comprises:

the SL-CSI-RS comprising a plurality of SL-CSI-RS resources, and feeding back first state information or second state information on a PSFCH resource corresponding to the largest value among measurement quantities of the plurality of SL-CSI-RS resources.

17. The method according to claim 1, wherein the signaling for triggering measurement reporting is an SCI or an MAC CE.

18. The method according to claim 17, wherein the signaling for triggering measurement reporting is an SCI, and the SL-CSI-RS for performing measurement by the second UE is an SL-CSI-RS scheduled by the SCI.

19. The method according to claim 18, wherein the signaling for triggering measurement reporting is a MAC CE, and the SL-CSI-RS for performing measurement by the second UE is at least one of the following:

an SL-CSI-RS transmitted most recently before the MAC CE;

an SL-CSI-RS transmitted in a first preset time window before the MAC CE;

an SL-CSI-RS transmitted most recently after the MAC CE; and an SL-CSI-RS transmitted in a second preset time window after the MAC CE.

20. A user equipment, comprising:

a transceiver; and a processor, which is coupled to the transceiver and configured to:

receive, from a first UE, a sidelink channel state information reference signal (SL-CSI-RS) scheduled by sidelink control information (SCI);

perform a measurement based on the SL-CSI-RS; and upon receiving a signaling for triggering measurement reporting transmitted by the first UE, report, to the first UE, a measurement result based on the SL-CSI-RS, wherein the SL-CSI-RS is a standalone transmission.

* * * * *